(12) United States Patent
Ito et al.

(10) Patent No.: US 6,542,816 B1
(45) Date of Patent: Apr. 1, 2003

(54) COMMUNICATION NAVIGATION SYSTEM

(75) Inventors: Yasuo Ito; Naoki Gorai; Takashi Sugawara; Satoshi Kitano; Hiroyuki Yamakawa, all of Hokkaido (JP)

(73) Assignee: Kabushikikaisha Equos Research (JP)

( * ) Notice: Subject to any disclaimer, the term of this patent is extended or adjusted under 35 U.S.C. 154(b) by 0 days.

(21) Appl. No.: 09/714,868

(22) Filed: Nov. 17, 2000

(30) Foreign Application Priority Data

Nov. 18, 1999 (JP) .......................................... 11-328881

(51) Int. Cl.⁷ ........................... G08G 1/123; H04B 7/00
(52) U.S. Cl. ........................ 701/209; 701/24; 701/25; 701/200; 340/905; 340/988; 73/178 R
(58) Field of Search ................................ 701/209, 210, 701/200, 24, 25, 26, 117, 118, 119; 340/905, 988, 990, 995; 73/178 R

(56) References Cited

U.S. PATENT DOCUMENTS

| | | | |
|---|---|---|---|
| 5,543,789 A | 8/1996 | Behr et al. | 340/995 |
| 5,559,520 A | 9/1996 | Barzegar et al. | 342/357 |
| 5,610,821 A | 3/1997 | Gazis et al. | 364/444.2 |
| 5,712,632 A | 1/1998 | Nishimura et al. | 340/995 |
| 5,806,018 A | 9/1998 | Smith et al. | 701/211 |
| 5,839,086 A | 11/1998 | Hirano | 701/201 |
| 5,948,040 A | 9/1999 | DeLorme et al. | 701/201 |
| 5,951,620 A | 9/1999 | Ahrens et al. | 701/200 |
| 6,107,944 A | * 8/2000 | Behr et al. | 340/955 |
| 6,155,611 A | * 9/2000 | Kimoto et al. | 455/456 |
| 6,131,066 A | 10/2000 | Ahrens et al. | 701/200 |

FOREIGN PATENT DOCUMENTS

| | | |
|---|---|---|
| EP | 0 786 646 A2 | 1/1997 |
| EP | 0 829 704 A2 | 9/1997 |
| EP | 0 911 607 A2 | 10/1998 |
| JP | 11-257975 | 9/1999 |
| JP | 2000-180187 | 6/2000 |

* cited by examiner

Primary Examiner—William A. Cuchlinski, Jr.
Assistant Examiner—Arthur D. Donnelly
(74) Attorney, Agent, or Firm—Lorusso & Loud

(57) ABSTRACT

A communication navigation system, wherein a navigation apparatus requests a recommended route guidance data to a information center and guides a user of the navigation apparatus to a destination by using the recommended route guidance data received from the information center.

In this present invention, the navigation apparatus transmits version data of road data held in the navigation apparatus at the request to the information center. The information center prepares a guidance data of recommended route using latest road data held in the information center, and transmits the data to the navigation apparatus. When the information center transmits the guidance data, the information center selects the type of data of the road links along the recommended route, in the guidance data, by comparing the version data received from the navigation apparatus and the version data of each road link along the recommended route. If each data of road links along the recommended route is considered to be contained in the road data held in the navigation apparatus, the information center transmits the only data which enable to specify the road link from the road data held in the navigation apparatus. On the hand, if each data of road links is considered not to be contained in the road data held in the navigation apparatus, the information center transmits whole data of the road link. Therefore, the navigation apparatus can generate the route guidance data by extracting road link data, from its own road data, corresponding to the road link specified by transmitted data and by reconstructing road link data using transmitted data.

11 Claims, 18 Drawing Sheets

| BLOCK | ID NUMBER OF CROSSING | NAME OF CROSSING | LATI-TUDE | LONGI-TUDE | ROAD HAVING SMALLEST ROAD NUMBER AMONG THOSE STARTING FROM THIS CROSSING | ROAD HAVING LARGEST ROAD NUMBER AMONG THOSE TERMINATING FROM THIS CROSSING | TRAFFIC SIGNAL AT THIS CROSSING |
|---|---|---|---|---|---|---|---|
| (X,Y) → (X',Y') | I | KANDA | aaa | nnn | ① | ② | YES |
| | II | YUSHIMA | aab | nno | ② | ① | YES |
| | III | ABC | aac | nnp | ④ | ③ | NO |
| | IV | DEF | aad | nnq | ⑥ | ⑤ | NO |

Fig. 4

| ROAD LINK NUMBER | ① | ② | ③ | ④ | ⑤ | ⑥ | ⑦ | ⑧ |
|---|---|---|---|---|---|---|---|---|
| STARTING POINT | I | II | II | III | III | IV | I | IV |
| TERMINATING POINT | II | I | III | II | IV | II | IV | I |
| NEXT ROAD LINK NUMBER HAVING THIS SAME STARTING POINT | ⑦ | ③ | ② | ⑤ | ④ | ⑧ | ① | ② |
| NEXT ROAD LINK NUMBER HAVING THIS SAME TERMINATING POINT | ④ | ⑧ | ③ | ⑥ | ⑦ | ① | ⑤ | ② |
| ROAD WIDTH | 1 | 1 | 2 | 2 | 2 | 1 | 0 | 0 |
| PROHIBIT INFORMATION(1) | – | – | – | – | ⑥ | ③ | – | – |
| PROHIBIT INFORMATION(2) | – | – | – | – | – | ② | – | – |
| GUIDANCE INVALIDATION | ③ | ⑦ | ⑤ | ② | ⑧ | – | – | ① |
| SPEED LIMIT(km) | 50 | 60 | 50 | 40 | 40 | 40 | 30 | 30 |
| NUMBER OF NODES | 15 | 13 | 9 | 20 | 25 | 30 | 9 | 3 |
| HEAD ADDRESS OF NODE SEQUENCE DATA | 100 | 200 | 300 | 500 | 600 | 700 | 800 | 900 |
| ROAD LINK LENGTH(m) | 150 | 400 | 100 | 80 | 60 | 60 | 75 | 25 |

Fig. 5

| ADDRESS | EAST LATITUDE | NORTH LONGITUDE | ATTRIBUTE |
|---|---|---|---|
| 100 | 135.5 | 35.1 | 01 |
| ... | | | |
| 200 | 135.6 | 35.2 | 01 |
| ... | | | |

| NAME OF CROSSING |
|---|
| ID NUMBER OF CROSSING |
| ANGLE |
| DISTANCE |
| NAME OF CROSSING |
| ⋮ |

| EAST LONGITUDE |
|---|
| NORTH LATITUDE |
| ID NUMBER OF CROSSING |
| ATTRIBUTE |
| ANGLE |
| DISTANCE |
| EAST LONGITUDE |
| ⋮ |

| ROAD ID | VERSION |
|---|---|
| 1 | 1.00 |
| 10 | 1.10 |
| 7 | 1.11 |
| 8 | 1.10 |
| 6 | 1.05 |
Fig.26
| ROAD ID | COORDINATES | NUMBER OF LANES | DISTANCE | ... |
|---|---|---|---|---|
| 10 | (1,2), (5,4), ... | 2 | 18 | ... |
| 7 | (9,12), (4,21), ... | 4 | 54 | ... |
| 8 | (13,20), (11,47), ... | 2 | 22 | ... |
Fig.27
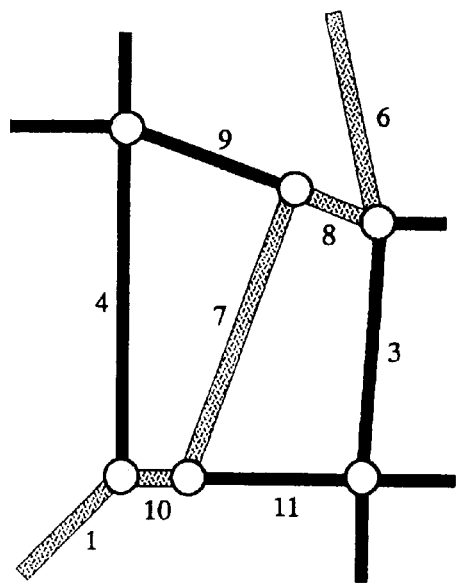
Fig.28
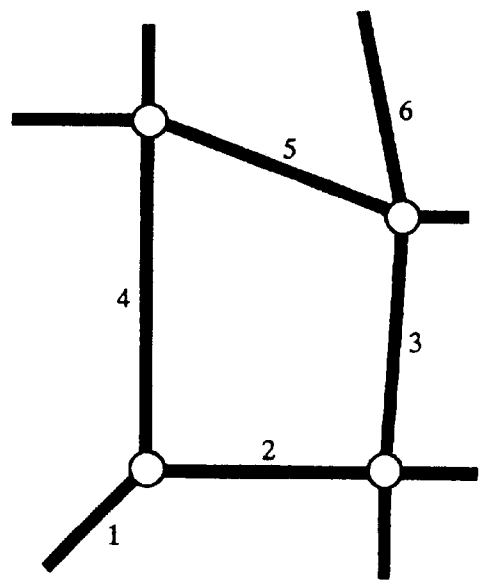
Fig.29

COMMUNICATION NAVIGATION SYSTEM

TECHNICAL FIELD

The present invention relates to a navigation system for guiding a user of a navigation apparatus from a current location to a destination and, more particularly to a communication navigation system wherein a navigation apparatus mounted on a vehicle receives a drive route to a destination from an information center or an external device by communication therebetween.

BACKGROUND OF THE ART

A navigation system has been widely used in a vehicle to provide a recommended route from a current location to a destination, along which a user of the system may drive the vehicle. The navigation system stores destination data, road link data and map data. The road link data is used for searching for a route from the current location to the destination. The current location of the vehicle is detected by a GPS receiver, for example. The systems refers to the current vehicle location and the searched route to guide the user by showing the direction which the user should head off or by giving instruction which roars the user should take, for example "go straight" or "turn at a crossing ahead".

Recently a communication navigation system has been developed, wherein a navigation apparatus mounted on a vehicle detects the current location and executes route guidance operation, whereas an information center, outside of the vehicle, searches a route to the destination and transmits the route to the navigation apparatus.

An example of the communication navigating system is proposed in Japanese patent laid-open publication No.10-160497 wherein an guiding route is determined by the navigation apparatus mounted on the vehicle based on the recommended route data which is prepared by the information center and transmitted therefrom to the navigation apparatus. In this system, the recommended route data comprises a series of index numbers, each index numbers can specify a particular road link from a road link database. Once the series of index numbers is transmitted to the navigation apparatus, the road links corresponding to the index numbers are extracted from a road links database in the navigation apparatus and guiding route data is generated by connecting the extracted road links. The system has the advantage of efficient data communication because of only transmitting a series of index numbers for road links along the recommended route instead of transmitting whole data for recommend route such as coordinates, street names and number of lanes etc,. those may be used for guiding the user along the route.

However, although the information center has the latest road links database, the navigation apparatus may not have a road link database same as in the information center.

Accordingly, the series of index numbers transmitted from the information center may include one or more index numbers specifying the road links which is only included in the latest version road link database in the information center but not in the road link database of an older version in the navigation apparatus. In such a case, the navigation apparatus is not able to determine a road link along the recommended route by using transmitted the series of the index numbers.

On the other hand, if the information center transmits whole data of recommended route, the user will owe high communication costs because of huge data volume for transmitting.

SUMMARY OF THE INVENTION

It is a primary object of the present invention to provide a novel communication navigation system which is capable of executing route guidance even if the road links data stored in the navigation apparatus mounted on the vehicle is of an older version than that stored in the information center without increasing communication costs.

To achieve the above objects, in accordance with an aspect of the present invention, there is provided a communication navigation system which includes an information center and at least one of navigation apparatuses, in which data concerning a recommended route from a current location of the navigation apparatus to a destination is transmitted from the information center to the navigation apparatus, and then route guidance is carried out in the navigation apparatus using the data transmitted from the navigation center, comprises:

the navigation apparatus of the communication navigation system having:
 road information storage means which stores road information including at least road network data which is composed of data of plural road links, and identification data of the road information;
 data transmitting means for transmitting at least data concerning a current location and a destination of the navigation apparatus and the identification data of the road information stored in the road information storage means to the information center;
 data receiving means for receiving data concerning recommended route guidance information from the information center;
 route guidance data generating means for generating route guidance data based on the road information stored in the road information storage means and based on the recommended route guidance information transmitted from the information center;
 route guiding means for guiding a user of the navigation apparatus from the current location to the destination of the navigation apparatus using the route guidance data;
and the information center of the navigation system having:
 database which stored road information including at least road network data which is composed of a plurality of road links and identification data of said road information;
 data receiving means for receiving at least data concerning the current location and the destination of the navigation apparatus and the identification data of the road information stored in the road information storage means from the navigation apparatus;
 recommended route determining means for determining recommended route, by extracting road links of the road network stored in the database, from the current location to the destination received from the navigation apparatus based on the road information stored in the database;
 judging means for judging respectively whether or not each data of road links along the recommended is contained in the road information stored in the road information storage means in the navigation apparatus, by comparing the identification data transmitted from the navigation apparatus and the identification data of the road information stored in the database;

recommended route guidance information generating means for generating recommended route guidance information, based on the database, containing data which enable to specify the each data of the road links along the recommended route from the road information stored in the road information storage means in a case where the each data of the road links is considered to be contained in the road information storage means by the judging means, and data which enable to reconstruct the each data of the road links along the recommended route without the road information stored in the road information storage means in a case where the each data of the road links is considered not to be contained in the road information stored in the road information storage means by the judging means.

data transmitting means for transmitting said recommended route guidance information to the navigation apparatus.

In a preferred embodiment of the present invention, the route guidance data generating means, referring to transmitted data of the recommended route guidance information from the information center, further comprising:

(a) means for extracting data of road links, which is specified by the transmitted data enabling to specify the each data of the road links along the recommended route, from the road information stored in the road information stored means in the navigation apparatus, (b) means for reconstructing data of road links by using the transmitted data enabling to reconstruct the each data of the road links along the recommended route, and the route guidance data generating means uses the means of (a) and/or (b) for generating recommended route guidance information.

In an example of the above preferred embodiment, the road information stored in the road information storage means further including guidance data corresponding to the plurality of the road links, and the road information stored in the database further including guidance data corresponding to the plurality of the road links, and the recommended route guidance information further contains guidance data corresponding to the each data of the road links which is considered not to be contained in the road information stored in the road information storage means, and the route guidance data generating means generates route guidance data by further using the guidance data contained in the transmitted data of the recommended route guidance, and by further extracting guidance data, from the road information storage means, corresponding to the each data of the road links specified by the transmitted data of the recommended route guidance.

In this example, both of the guidance data stored in the road information storage means and the guidance data stored in the database contain at least one of:

data of a road length;

data of coordinates for drawing;

data of coordinates for matching a location of the navigation apparatus;

data of number of lanes; corresponding to the each road link.

In another preferred embodiment of the present invention, both of the identification data stored in the road information storage means and the identification data stored in the database are a version number of the road information, and the database has road information of all version, and the recommended route determining means determines the recommended route using road information of latest version stored in the database, and the judging means judges whether or not the each data of a road link along the recommended is contained in the road information stored in the road information storage means in the navigation apparatus, by comparing the version number of the latest road information being used for determining the recommended route and the version number transmitted from the navigation apparatus.

In still another preferred embodiment of the present invention, the identification data stored in the road information storage means is a version number of the road information, and the each data of the road links in the database contains a version number expressing a road information version at which the each data of the road links have been newly added for the road information and the judging means judges whether or not the each data of the road links along the recommended route is contained in the road information stored in the road information storage means in the navigation apparatus, by respectively comparing the version number of the each data of the road links and the version number transmitted from the navigation apparatus.

In still another preferred embodiment of the present invention, the information center further comprises external information acquisition means for acquiring latest traffic condition and/or latest road condition, and the recommended route determining means determines the recommended route from the current location to the destination of the navigation apparatus in consideration of the latest traffic condition and/or the latest road condition.

In still another preferred embodiment of the present invention, both of the data transmitting means and the data receiving means of the information center, and both of the data transmitting means and the data receiving means of the navigation apparatus are designed so as to communicate using packet switching technique and/or circuit switching technique.

BRIEF DESCRIPTION OF DRAWINGS

The above and other objects of the present invention will become apparent from the following description when read in conjunction with the accompanying drawings in which:

FIG. 4 is an example of data table showing the contents of a road data file indicating the road data of the roads shown in the road network of FIG. 2;

FIG. 5 is an example of data table showing the contents of the node data file;

FIG. 6 is an explanatory view showing an example of the route data file;

FIG. 26 is an example of data table showing the contents of the searched route stored in the map information memory of the center device in accordance with a second embodiment of the present invention;

FIG. 27 is an example of data table showing the contents of the road attribute information stored in the map information memory of the center device in the second embodiment;

FIG. 28 is an explanatory view showing an example of the road network of the latest version 1.11 stored in the center device;

FIG. 29 is an explanatory view showing an example of the road network of the older version 1.05 stored in the navigation apparatus;

DESCRIPTION OF EMBODIMENTS OF THE INVENTION

Figure 1:
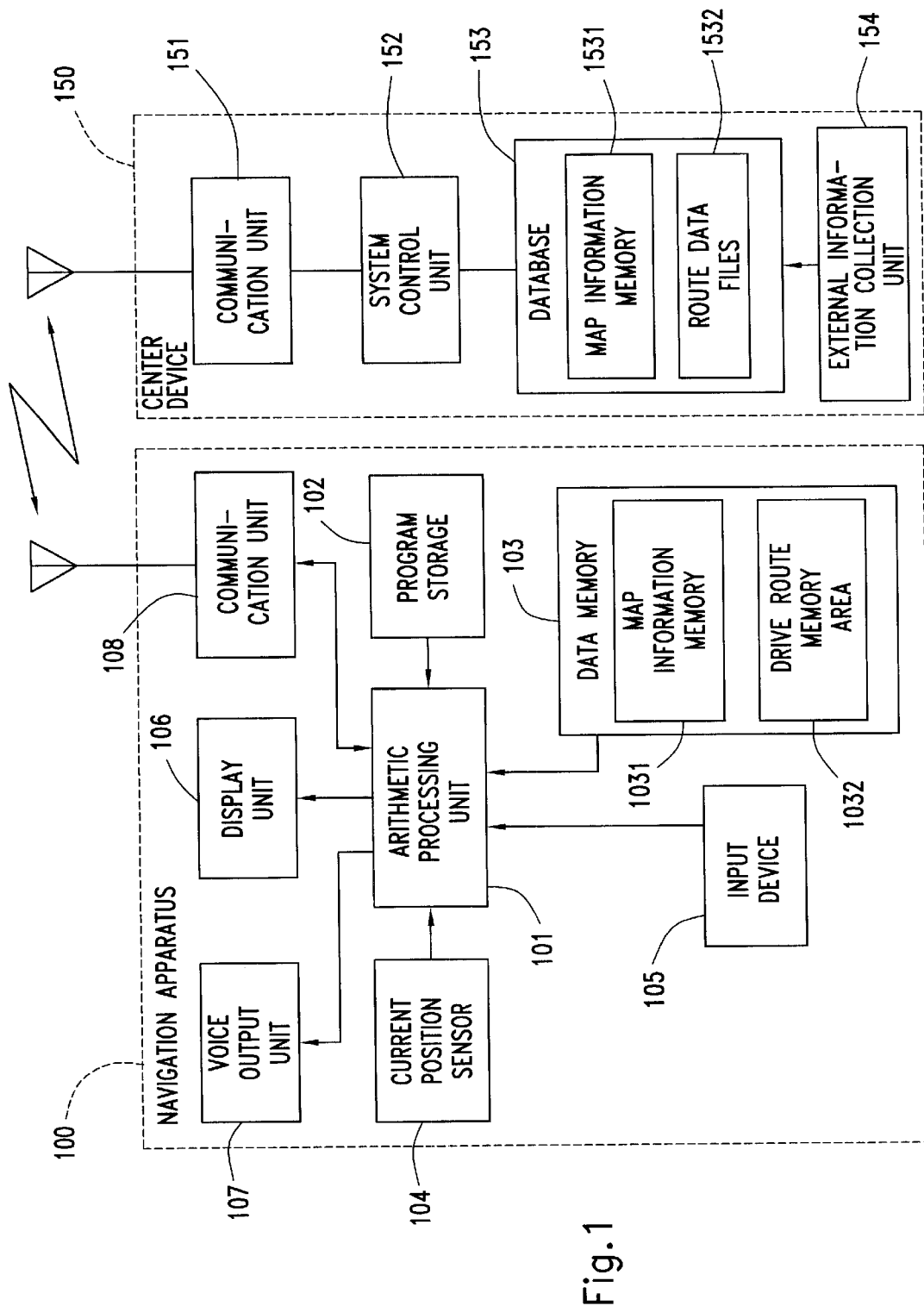
FIG. 1 is a block diagram showing an overall arrangement of a route guidance system including the communication navigation system according to the first embodiment.

Preferred embodiments of the present invention will be described in reference to the accompanying drawings FIGS. 1–31.

(1) Summary of First Embodiment

In a first embodiment, the crossing specifying data received from an external device is used to generate corresponding route data, by which route guidance is executed.

In this embodiment, a route may be determined even when the navigation apparatus has no crossing or road data corresponding to the route data acquired from the external device, so that route guidance may be executed.

In this embodiment, the information center searches a recommended route to a destination which is transmitted from the navigation apparatus, and extracts crossings located on the recommended route to prepare the crossing specifying data which comprises a series of coordinates of the on-route crossings. The crossing specifying data is transmitted to the navigation apparatus.

After transmitting the destination to the information center, the navigation apparatus receives the crossing specifying data. The navigation apparatus then matches the coordinates of the on-route crossings contained in the crossing specifying data with the coordinates of crossings stored in its own road network data to specify each of the on-route crossings. The coordinates of any on-route crossing which can not be specified in this matching operation should be stored as new crossing in the navigation apparatus.

The navigation apparatus specifies every road link between two adjacent on-route crossings from the own road data. When no road link is found between the two adjacent crossings, these crossings are connected to each other by a straight line, which is stored as a new road link in the own road data.

As above described, even when there is no data (crossings, road links) in the road network data corresponding to the on-route crossings transmitted from the information center, the navigation apparatus creates the corresponding data, which makes it possible to determine a drive route. In other words, even when there are any differences between the road network data in the information center and in the navigation apparatus, the navigation apparatus can gene rate route guidance data corresponding to the determined drive route, and can carry out route guidance using the generated route guidance data. In the first embodiment, determination of the drive route depends only on the coordinate data of the on-route crossings. This minimizes the time and cost required for communication with the information center.

The road network data in the information center is updated in response to collecting new crossing/road data. In contrast, the road network data in the respective navigation apparatuses has usually the fixed contents, unless subjected to a version-up. No version-up may be applied to some type of the navigation apparatus. This will results in a difference between the road network data in the information center and in the navigation apparatus. Nevertheless, in accordance with the first embodiment, the navigation apparatus can specify the drive route by using the crossing specifying data transmitted from the information center, and therefore execute the route guidance.

(2) Detailed Description of First Embodiment

FIG. 1 shows an overall arrangement of a route guidance system including the information center and navigation apparatus according to the first embodiment.

The route guidance system shown in FIG. 1 comprises a navigation apparatus 100 mounted on a vehicle and a center device 150 installed in an information center and communicable with a plurality of the navigation apparatuses 100.

The navigation apparatus 100 has an arithmetic processing unit 101, a program storage 102, a data memory 103, a current location sensor 104, an input device 105, a display unit 106, a voice output unit 107 and a communication unit 108.

The center device 150 has a communication unit 151, a system processing unit 152, a database 153 and an external information collection unit 154.

The arithmetic processing unit 101 has a CPU for executing various operation including request operation for transmission to center device 150 of a destination and a request of return transmission of the crossing specifying data, matching operation for matching of the crossing coordinates series and map information in accordance with the received crossing specifying data (FIG. 14), road link specifying operation (FIG. 15), new crossing/road link registration operation (FIG. 16 and FIG. 17), new road link registration operation (FIG. 18), route guidance operation and route search operation for searching a route which may be used solely at the navigation apparatus.

The program storage 102 stores various programs and data for use in execution of the above operation by arithmetic processing unit 101. The program storage 102 may be a ROM or other suitable storage means.

The data memory 103 may be a RAM, CD-ROM, flash memory, DVD-ROM (digital versatile disc ROM), hard disc or other suitable storage means. The data memory 103 includes a map information memory 1031 and a drive route memory are 1032.

The map information memory 1031 may be a CD-ROM, DVD-ROM, hard disc and other storage means of a greater storage capacity. The map database stored in the map information memory 1031 includes crossing data files storing crossing data, road data files storing road data and node data files storing node data. The road network data comprises the crossing data, the road data and the node data.

Figures 2, 3:
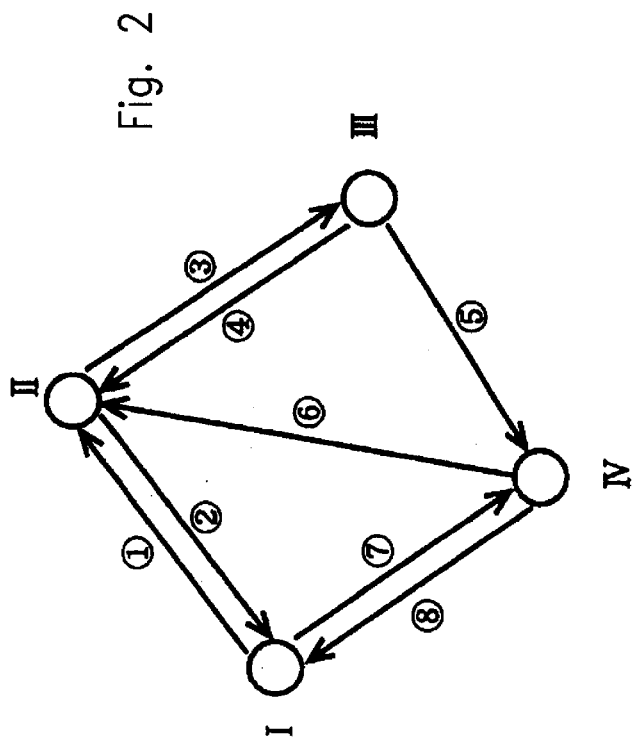
FIG. 2 is an explanatory view showing an example of the road network comprising crossings and road links.
FIG. 3 is an example of data table showing the contents of a crossing data file indicating the crossing data of the crossings shown in the road network of FIG. 2.

FIG. 2 shows an example of the road network comprising four crossings indexed y the crossing numbers I–IV and eight road links indexed by the road numbers 1–8. From the example shown in FIG. 2, the files stored in map information memory 1031 will be described below.

FIG. 3 is a data table showing the contents of one crossing data file indicating the crossing data of the crossings I–IV shown in the road network of FIG. 2. As shown, crossings located within a predetermined rectangular block are stored in one crossing data file. Each block is defined by the coordinates (x, y) and (x', y') of diagonal points. Such a manner of storage of the crossing data will facilitate the matching operation compared with another manner in which all of the crossing data are stored in a single file.

As shown in FIG. 3, the crossing data file stores the crossing data for each of the crossings I–IV. Each crossing data includes the crossing number, name, latitude longitude, the smallest road link number among road links starting at this crossing, the greatest road link number among roads terminating at this crossing, and signal presence (whether or not there is a signal at the crossing).

FIG. 4 is a data table showing the contents of one road data file indicating the road data of the roads 1–8 shown in the road network of FIG. 2. As shown, the road data file stores the road data for each of the road links 1–8. Each road data includes the crossing number at the starting point, the crossing number at the terminating point, the next road link number having the same starting point, the next road link number having the same terminating point, road width, prohibit information, guidance invalidation information, speed limit, the number of nodes, the head address of node sequence data, and road link length.

FIG. 5 is a data table showing an example of the contents of the node data file. As shown, the node data files stores the node data concerning crosswalks, tunnels and other remarkable points on the road link. The node data comprises the latitude, longitude and attribute. Each road comprises a series of nodes. The node data specifies a point on the road link. The road link is represented by connecting the adjacent twos, respectively. For example, the No.1 road link in FIG. 2 includes 15 nodes and starts from the node data of No.100 address (FIG. 4), which means that this road link comprises the node data of No.100–114 addresses.

The drive route memory area 1032 in the data memory 103 is preserved at a predetermined area of a RAM, for storing the crossing specifying data received from center device 150. As described before, the navigation apparatus 100 prepares a drive route in accordance with the crossing specifying data. The prepared drive route is also stored in the drive route memory area 1032. The RAM is also used as a working area for use in execution of the various operation programs by the arithmetic processing unit 101 and reading and writing of necessary data in communication with the center device 150.

The current location sensor 104 has a GPS receiver which receives radio waves from plural earth satellites to determine absolute coordinates of the current vehicle location. The current location sensor 104 may also have a speed sensor and a compass, both used for inertial navigation. These sensors detect a relative location of the vehicle which may be used to determine the current vehicle location in a case where no radio waves is receivable by the GPS receive or the vehicle is running through a tunnel. The relative vehicle location may also be used to eliminate an error of the absolute vehicle location detected by the GPS receiver.

The input device 105 may comprise a touch panel attached to a front panel of display 106. In data inputting operation with the touch panel, a touch by the user's finger on a particular icon shown on the display 106 will input corresponding data or command. Another example of the input device 105 is a voice in put unit employing a microphone and a voice recognizing unit. The user's voice through the microphone is recognized by the voice recognizing unit so that corresponding data or command may be inputted.

The display unit 106 may comprise a liquid crystal display (LCD) or a cathode-ray tube (CRT) for representing the road map and the details around the crossing in the route guidance operation. Input key images corresponding to the above-described touch panel are also shown on the display 106.

The voice output unit 107 includes a voice synthesizer and speakers. During the route guidance to the destination, the voice synthesizer prepares voice guidance data such as "Turn right at the crossing 100 m ahead", for example, which is outputted through the speakers. The speakers connected to an audio instruments mounted on the vehicle may be used for this purpose. Another speaker set may be attached on the driver's seat or at the upper center of the windshield, for example.

The communication unit 108 of the navigation apparatus 100 comprises a modem End a wireless communication device such as cellular phone and PHS for telephone call and data communication with the center device 150.

The communication unit 151 of the center device 150 comprises communication equipment such as a modem, a terminal adapter and a router for communication with the navigation apparatus 100 through a communication link (telephone line etc.).

The system control unit 152 comprises a computer system including a CPU, a ROM, a RAM and other devices. The CPU of the system control unit 152 controls the overall system in accordance with the programs stored in memory means including the ROM. The CPU also executes route search operation for searching a recommended drive route in response to receipt of the current location and the destination from the navigation apparatus 100, on-route crossing extract operation for extracting crossings on the recommended drive route, crossing specifying data transmission operation for transmitting the crossing specifying data to the navigation apparatus 100, database updating operation for updating a database 153 (stored in a map information memory 1531) in response to collecting of new crossing/road data, and other operation to be made at the center device 150.

The ROM stores programs and data for use in execution of the operation by the CPU.

The RAM is used as a working memory area for writing and reading of data in execution of the operation by the CPU.

The database 153 stores a map information memory 1531, route data files 1532 and the external information files collected by the external information collection unit 154.

The external information which is collected by the external information collection unit 154 and stored in the external information files includes, for example, the traffic jam information (location, distance and severeness of a traffic jam) and the road construction information (section and period of road construction), the traffic accident information (location and severeness of a traffic accident, whether or not the road on which the accident have occurred is closed, expected time of restoration). These external information is used in route search operation by the center device 150. The external information collection unit 154 also collects data regarding newly built road and crossing, and data regarding change of traffic restriction (no entry, no right or left turn, etc.). These data are used to update the contents stored in the map information memory 1531.

The map information memory 1531 may be a CD-ROM, DVD-ROM, hard disc and other storage means of a greater storage capacity. The map database stored in the map information memory 1531 includes crossing data files storing crossing data, road data files storing road data and node data files storing node data. The road network data comprises the crossing data, the road data and the node data.

The crossing data files, the road data files and the node data files stored in the map information memory 1531 are substantially the same as those in the map information memory 1031 of the navigation apparatus 100, with the exception of the following.

First, the respective files in the map information memory 1531 are updated to reflect the latest data and, therefore, may have different contents from those of the files in the map information memory 1031 of the navigation apparatus 100.

In the map information memory 1031 of the navigation apparatus 100, as described before in connection with the data table of FIG. 3, there are a plurality of the crossing data files, each storing the crossing data contained in a specific rectangular block, for facilitating matching operation. Such matching operation is not required at the center device 150. Accordingly, the map information memory 1531 of the center device 150 may have a single crossing data file. In a modified embodiment, the map information memory 1531 stores a plurality of the crossing data files in the same manner as in the map information memory 1031 of the navigation apparatus 100. In this modified embodiment, the center device 150 transmits an identification code or number of a block containing the on-route crossings to the navigation apparatus 100, together with the crossing specifying data.

The node data files in the map information memory 1531 may be the same as show by example in the data table of FIG. 5. In a modified embodiment, the map in formation memory 1531 may not have the node data files, because it is not always necessary that the searched drive route is displayed at the center device 150.

The route data files 1532 may be stored in a RAM or any other suitable storage medium. An example of the route data file 1532 which is prepared as a result of route search operation is shown in FIG. 6. This route data file stores the crossing sequence data (FIG. 6(*a*)) and the node sequence data (FIG. 6(*b*)). The crossing sequence data comprises the name, identification number, angle and distance for each crossing. The node sequence data comprises the coordinates (longitude and latitude), the crossing number, attribute, angle and distance for each node. The on-route crossings extracted from the crossing sequence data of FIG. 6(*a*), which are transmitted, via the communication unit 151, to the navigation apparatus 100.

In an embodiment wherein the navigation apparatus 100 also operates to search a drive route without data transmission from the center device 150, the route data files comprising the crossing sequence data (FIG. 6(*a*)) and the node sequence data (FIG. 6(*b*)) should also be stored in the RAM of the navigation apparatus 100.

In this embodiment, the navigation apparatus 100 sequentially reads out the road link numbers of the road links constituting the route from the crossing sequence data to specify the road link along which the vehicle should run. The node sequence data stored in the RAM of the navigation apparatus 100 may only in include the crossings at which guidance to the driver is needed. Accordingly, the navigation apparatus 100 sequentially reads out the road link number at every time when the vehicle reaches a predetermined location.

The navigation apparatus 100 and the center device 150 will operate as follows.

Figures 6A, 6B, 7:
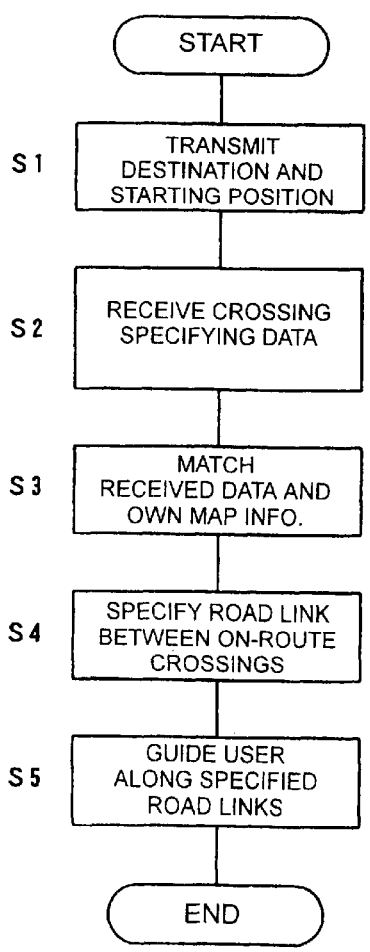
FIG. 7 is a flowchart of the navigation operation to be executed by the navigation apparatus mounted on the vehicle.

FIG. 7 is a flowchart of the operation to be executed by the navigation apparatus 100.

First, the arithmetic processing unit 101 acquires the destination inputted by the user and the current vehicle location (starting location) detected by the current location sensor 104, and transmits these data to the center device 150, via the communication unit 108 (at S1).

Communication between the communication units 108 and 151 is made preferably by using packet switching technique. It may be made by using circuit switching technique.

The arithmetic processing unit 101 then acquires, via the communication unit 108, the crossing specifying data (a sequence of the coordinates of the on-route crossings) from the center device 150 (at S2). The crossing specifying data is stored in a predetermined area of the RAM.

The arithmetic processing unit 101 then carries out the matching operation (at S3). More particularly, each of the on-route crossings included in the crossing specifying data is compared with the crossing data in the crossing data file in the map information memory 1031 to specify a corresponding crossing.

Then, at S4, the arithmetic processing unit 101 specifies each road link between the two adjacent ones of the crossings specified at S3, and execute route guidance for guiding the user of the navigation apparatus along the specified road links (at S5).

Figure 8:
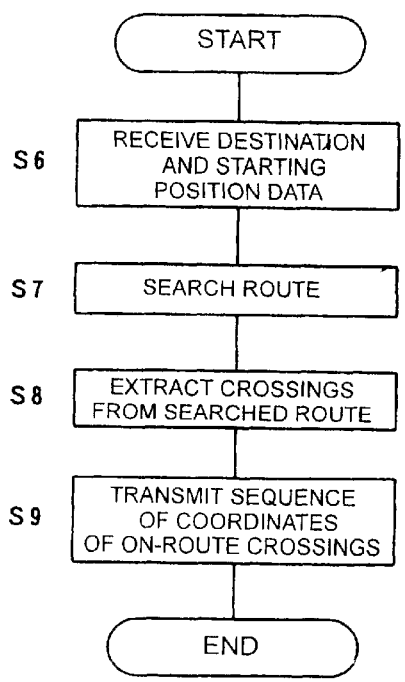
FIG. 8 is a flowchart of the route search and transmission operation to be executed by the center device.

The center device 150 operates as follows: FIG. 8 is a flowchart of the route search and transmission operation to be executed by the center device 150.

The system control unit 152 of the center device 150 acquires the destination and the starting point from the navigation apparatus 100, via the communication unit 151 (at S6).

The system control unit 152 then searches a recommended drive route from the starting point to the destination, in reference to the crossing data, the node data and the road data in the map information memory 1531 (at S7). The route search operation may be made in a known manner, an example of which is described in Japanese patent laid-open publication No.1-173297 and No.1-173298, which are incorporated herein for reference.

The basic condition in searching a drive route is a distance between the crossings. In this embodiment, a route of the shortest distance from the starting point to the destination is determined as a drive route. The traffic jam and other traffic information acquired by the external information collection unit 154 should be taken into consideration in the route search operation. The searched drive route is stored in the route data file (FIG. 6) in the RAM. The system control unit 152 then extracts the respective crossings on the drive route as on-route crossings from the crossing sequence data (FIG. 6(a)) in the route data file (at S8). A sequence of the coordinates of the extracted crossings (the on-route crossings) is transmitted via the communication unit 151 to the navigation apparatus 100 (at S9).

The operation made by the navigation apparatus 100 and the center device 150 will be described in more detail by way of example.

Figure 9:
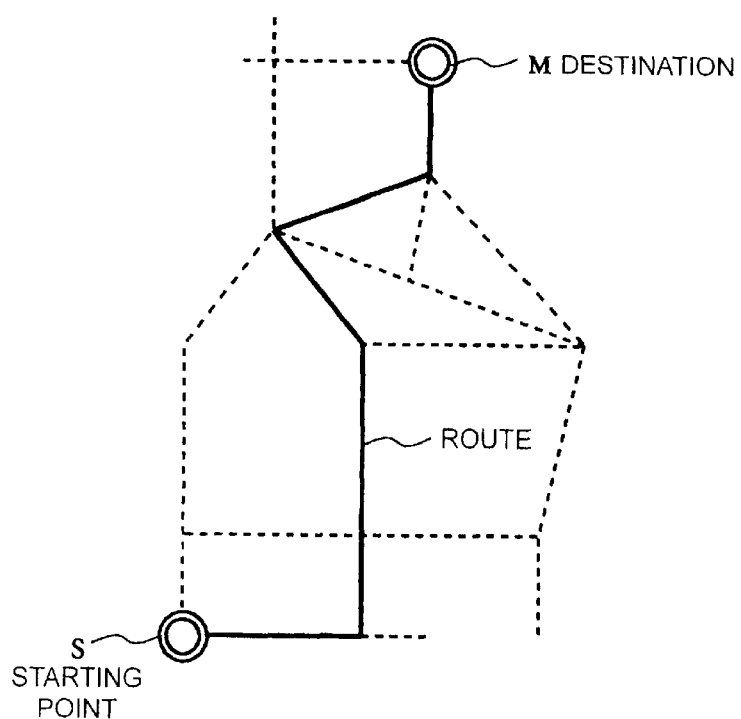
FIG. 9 is an explanatory view diagrammatically showing the operation by the center device, by way of example.
Figure 10:
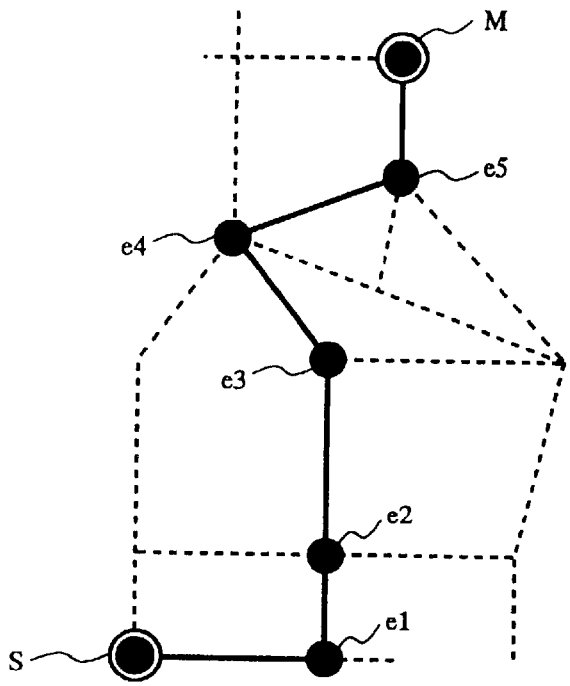
FIG. 10 is an explanatory view diagrammatically showing the operation by the center device, followed by the operation of FIG. 9.

The operation made by the center device 150 is diagrammatically shown in FIG. 9 and FIG. 10. In response to receipt of the starting location S and the destination M from the navigation apparatus 100, the center device 150 searches a drive route, shown by solid lines, in reference to the crossing data in the map information memory 1531 and the road data shown by dotted lines.

Then, as shown in FIG. 10, crossings e1–e5 on the drive route are extracted so that a sequence of their coordinates are transmitted to the navigation apparatus 100 as the crossing specifying data.

Figure 11:
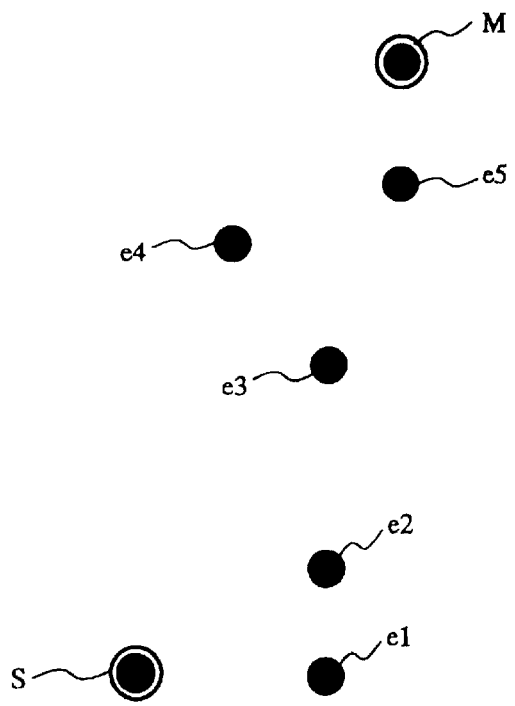
FIG. 11 is an explanatory view diagrammatically showing the operation by the navigation apparatus, in response to receipt of the crossing specifying data from the center device.
Figure 12:
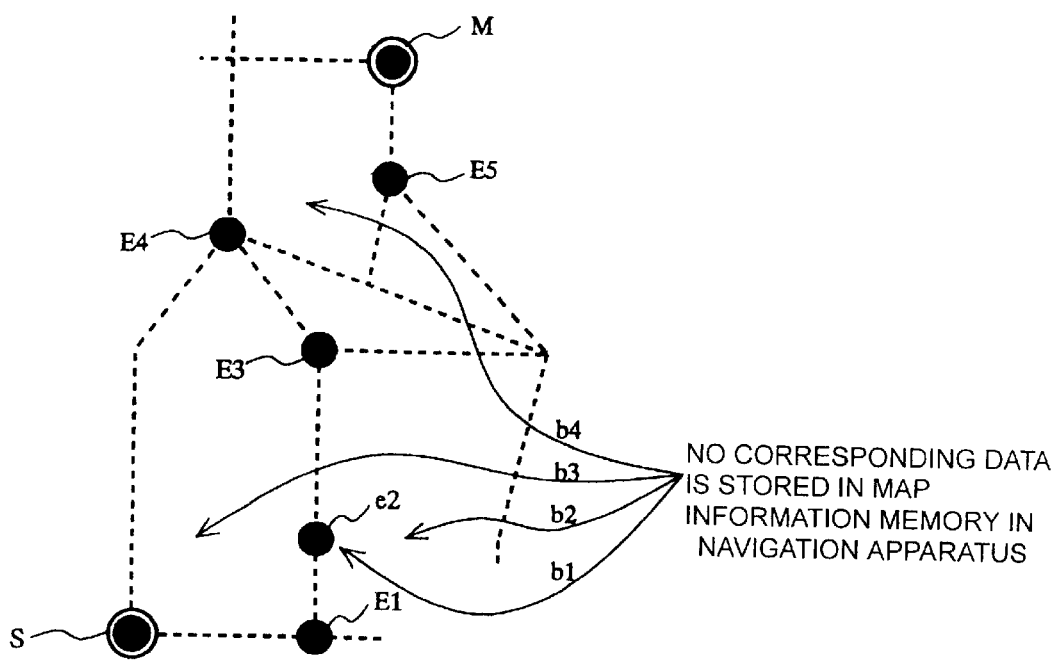
FIG. 12 is an explanatory view diagrammatically showing the operation by the navigation apparatus, followed by the operation of FIG. 11.
Figure 13:
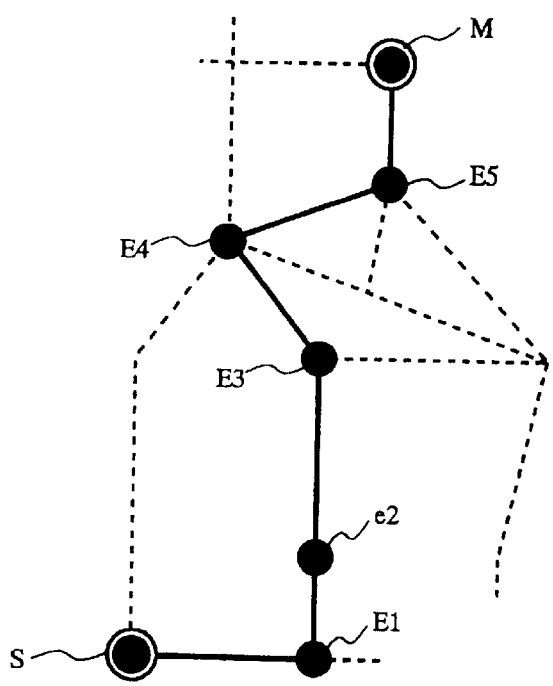
FIG. 13 is an explanatory view diagrammatically showing the operation by the navigation apparatus, followed by the operation of FIG. 12.

The operation made by the navigation apparatus 100 is diagrammatically shown in FIG. 11, FIG. 12 and FIG. 13. The map information memory of the navigation apparatus 100 stores the crossing data E1, E3–E5 and the road data shown in dotted lines in FIG. 12. In this example, as noted from comparison between FIG. 10 and FIG. 12, the on-route crossing e2 and the road links b2, b3 and b4 are included in the map information memory 1531 of the center device 150 but not included in the map information memory 1031 of the navigation apparatus 100. Further, in the map information memory 1031 of the navigation apparatus 100, the road link b1 is stored as a single road link connected between the crossings E1 and E3, whereas it comprises a first road link between the crossings e1 and e2 and a second road link between the crossings e2 and e3 in the map information memory 1531 of the center device 150. In addition, there is the road data between the on-route crossings e4 and e5 in the map information memory 1531, but no corresponding road data is stored in the map information memory 1031.

In response to receipt of the crossing specifying data (a sequence of the coordinates of the on-route crossings e1–e5) from the center device 150, the navigation apparatus 100 stores this data into the RAM, together with the starting point S and the destination M which has been transmitted to the center device 150. FIG. 11 shows a map on which the starting point S, the destination M and the received on-route crossings e1–e5 are located.

Then, as shown in FIG. 12, the navigation apparatus 100 sequentially reads out the coordinates of the on-route crossings, which are matched with the crossing data in the own map information memory 1031. In this crossing matching operation, the crossing E1 and E3–E5 are extracted in success corresponding to the on-route crossings e1 and e3–e5, but no crossing corresponding to the on-route crossing e2 is found in the own map information memory 1031. Accordingly, the navigation apparatus 100 judges that the on-route crossing e2 is a newly established crossing and locate the on-route crossing e2 at the coordinates in the crossing specifying data received from the center device 150.

Simultaneously with the crossing matching operation, the navigation apparatus 100 specifies each road link between the adjacent two on-route crossings. As a result of the road link specifying operation, the road links from the starting location S to the destination M shown by solid lines in FIG. 13 are specified.

The navigation apparatus 150 judges that a road link is newly constructed between the crossings E4 and E5, because there is no corresponding road data in the own map information memory 1031. Accordingly, it adds a road link between the crossings E4 and E5, as shown in FIG. 13.

As described before, there is no crossing data in the map information memory 1031 corresponding to the on-route crossing e2. In this example, the crossing e2 is located on the road link between the crossings E1 and E3. Accordingly, the navigation apparatus 150 judges that there are two road links, one being connected between the crossings E1 and e2 and the other between the crossings e2 and E3. In this example, the existing road link between the crossings E1 and E3 are divided into two road links at the junction of the crossing e2.

If the crossing e2 which can not be found in the map information memory 1031 is not located on the road link between the crossings E1 and E3, the navigation apparatus 150 judges that there are two newly-constructed road links, apart from the existing road link between the crossings E1 and E3, one starting at the crossing E1 but separating therefrom to the crossing e2 and the other starting at the crossing e2 and terminating at the crossing E3.

In the manner described above, the drive route comprising the crossings E1, e2, E3, E4 and E5 and the road links therebetween is specified as shown by solid lies in FIG. 13. These data are stored in the drive route memory area 1032. The drive route prepared by the navigation apparatus 100 will be the same as the drive route from the starting point S to the destination M in FIG. 9 which is prepared by the center device 150.

As described above, the navigation apparatus 100 carries out the matching operation to specify the crossings and the road links contained in the drive route to the destination, in accordance with the on-route crossings in the crossing specifying data from the center device 150. This matching operation will be described in more detail in reference to the flowchart of FIG. 14.

Figure 14:
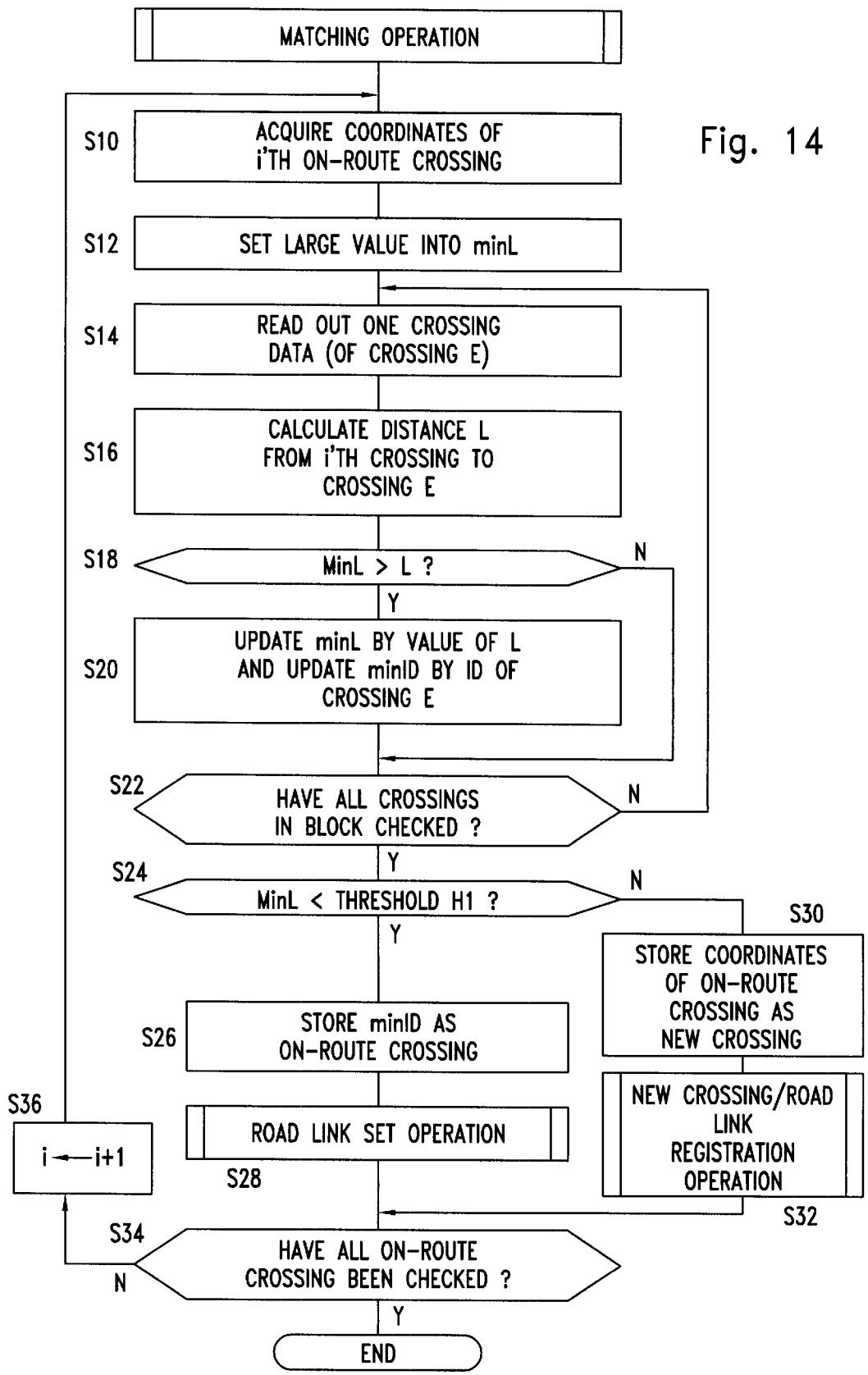
FIG. 14 is a flowchart of a main routine for specifying the crossings and the roads which comprises the drive route, in accordance with the sequence of the coordinate, of the on-route crossings (the crossing specifying data) received from the center device.

FIG. 14 shows a main routine for specifying the crossings and the road links which comprises the drive route, in accordance with the sequence of the coordinates of the on-route crossings (the crossing specifying data) received from the center device 150. After receipt, the sequence of the coordinates of the on-route crossings is stored in the RAM of the navigation apparatus 100.

First the Arithmetic processing unit 101 of the navigation apparatus 100 acquires the coordinates of the i'th on-route crossing from the sequence of the coordinates of the on-route crossing in the RAM (at S10). It then sets a minimal distance minL of a predetermined sufficiently long distance, for example 10,000 m (at S12).

The arithmetic processing unit 101 searches the nearest crossing to the i'th on-route crossing. More particularly, it reads out the crossing data of one crossing (hereinbelow referred to as a crossing E) in a block containing the on-route crossing (at S14). It then calculates a distance L from the i'th on-route crossing to the crossing E, that is a distance between the coordinates of these crossings (at S16).

The arithmetic processing unit 101 then compares the values of minL and L (at S18). When L is smaller than minL ("Yes" at S18), it is supposed that the crossing E is the nearest crossing to the i'th crossing so that the value of minL is replaced by the value of L and sets the identification code or number of the crossing E as minID(at S20). When, on the other hand, L is equal to or greater than L ("No" at S18), meaning that the crossing E is not the nearest crossing to the i'th crossing, the step of S20 is skipped to directly advance to the next step S22.

The arithmetic processing unit 101 judges if all of the crossings in the block have been subjected to the steps S14–S20. When there is any untreated crossing ("No" at S22), it is subjected to the steps S14–S20 in the above-described manner.

When all of the crossings in the block have been treated through S14–S20 ("Yes" at S22), it is judged if minL is smaller than a first threshold H1 (at S24). More specifically, it is judged at S24 if the nearest crossing to the i'th crossing in the block is located within a predetermined distance (H1) from the i'th crossing When minL is smaller than the first threshold H1 ("Yes" at S24), the nearest crossing E is supposed to be located within a margin of matching error from the i'th crossing and, therefore, crossing E is judged as i'th crossing on the route. In this case, the arithmetic processing unit 101 stores the crossing ID (that is minID) of the crossing E as the on-route crossing in the drive route memory area 1032 (at S26), followed by execution of a sub-routine of FIG. 15 for the road link set operation (at S28).

When minL is equal to or greater than the first threshold H1 ("No" at S24), the arithmetic processing unit 101 determines the i'th on-route crossing as a new crossing. Accordingly, its coordinates are stored in the drive route memory area 1032 (at S30), and a sub-routine of FIG. 16 and FIG. 17 for new crossing/road link registration operation is executed (at S32).

After executing the operation at S28 or S32, the arithmetic processing unit 101 judges if all of the on-route crossings have been subjected to the matching operation (at S34). When the matching operation starts at the starting point S, the destination M should also be subjected to the matching operation. When it starts at the destination M, it should apply to the starting point S.

If there is any on-route crossing which has not been subjected to the matching operation("No" at S34), the arithmetic processing unit 101 increments the value of "i" by one (at S36) so that the next on-route crossing will be subjected to the matching operation.

Figure 15:
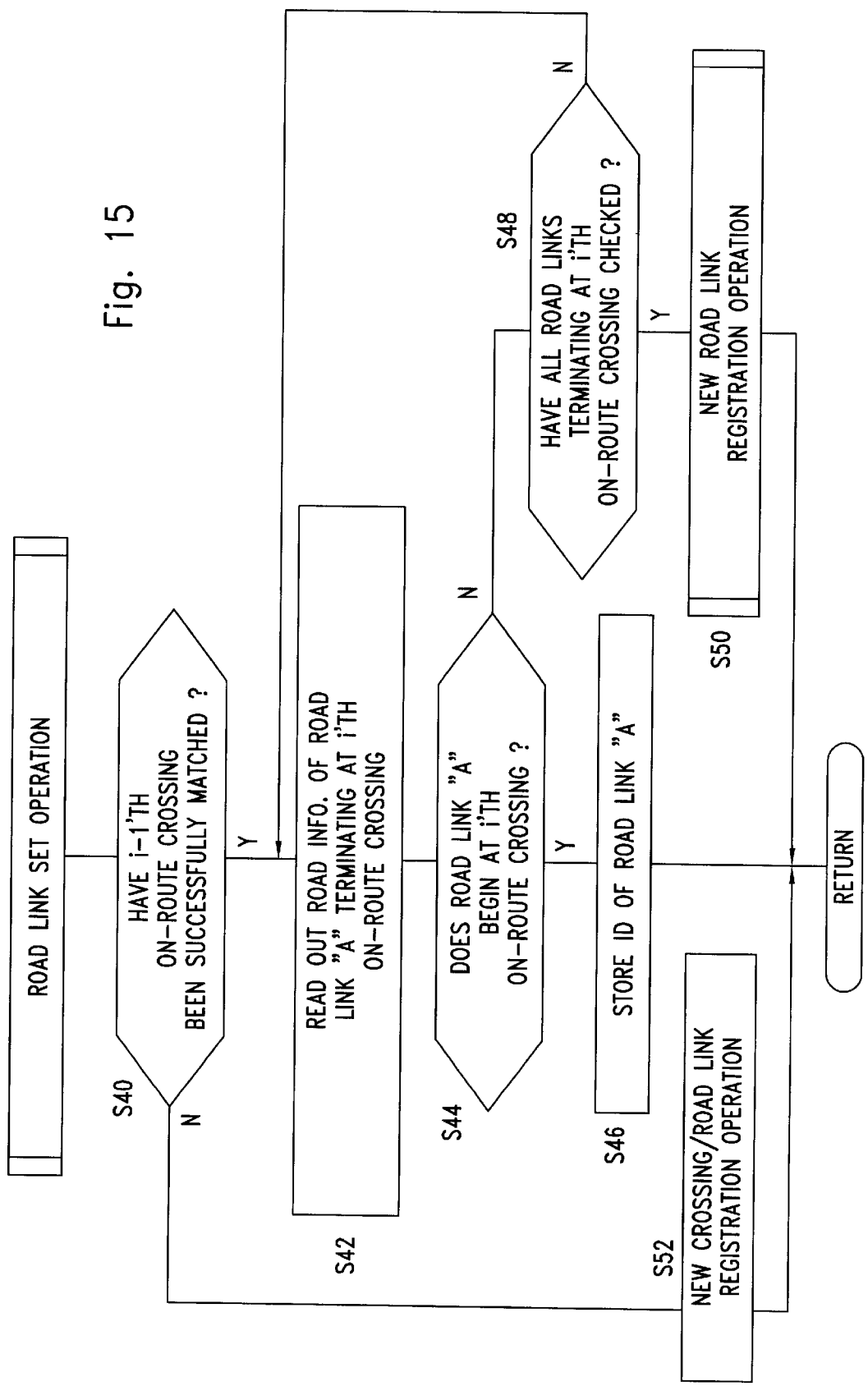
FIG. 15 is a flowchart of a sub-routine for the road link specifying operation.

The flowchart of sub-routine for the road link specifying operation at S28 is shown in FIG. 15. The road link set operation is executed after the matching operation for the i'th crossing is completed, so as to specify a road link between the adjacent two crossings which have been matched with the i–1'th and the i'th on-route crossings. This operation is simply based on the assumption that there is only one road link between the two adjacent on-route crossings.

The arithmetic processing unit 101 judges if the i–1'th on-route crossing has been successfully matched with some crossing in the map information memory 1031 (at S40). When the matching operation has been succeeded with respect to the i–1'th on-route crossing ("Yes" at S40), it then retrieves the road information of one the road links (refer to road link A hereafter) which terminate at the i'th on-route crossing, from the road data files of FIG. 4 (at S42). It then judges if the retrieved road link A begins at the i–1'th on-route crossing (at S44).

If the retrieved road link A begins at the i–1'th on-route crossing ("Yes" at S44), the arithmetic processing unit 101 specifies the retrieved road link A as the drive route between the crossings. The number or code identifying the road link A is stored in the drive route memory area 1032 (at S46), and the procedure is returned to the main routine.

If the retrieved road link A does not begin at the i–1'th on-route crossing ("No" at S44), the arithmetic processing unit 101 then judges at S48 if all road links terminating at the i'th crossing have been checked at S44. When there remains any un-checked road link ("No" at S48), it is checked in the same manner.

When no road data corresponding a road link between the i–1'th and i'th crossings in the road information memory 1032, the judgment at S44 produces "No" result for all of the road links terminating at the i'th crossing. In this case ("Yes" at S48), the new road link registration operation is executed at S50 in accordance with a flowchart of FIG. 18. In summary, the new road link registration operation at S50 is executed when the road information memory 1032 has the crossing data corresponding to the i–1'th and i'th crossings but does not have the road data corresponding to the road link connected therebetween. Then, the procedure is returned to the main routine.

Figure 16:
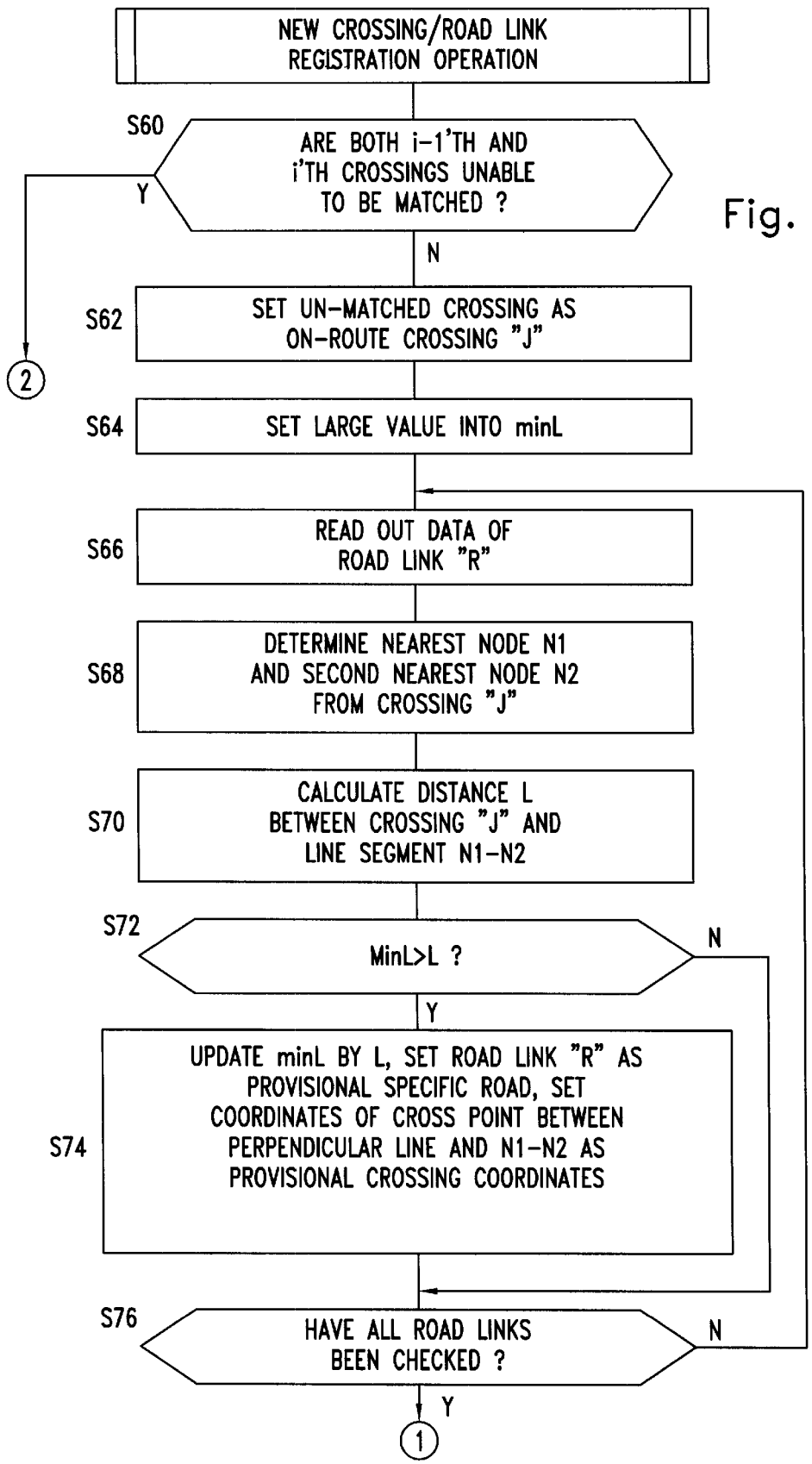
FIG. 16 and FIG. 17 show a flowchart of a sub-routine for the new crossing/road link registration operation.
Figure 17:
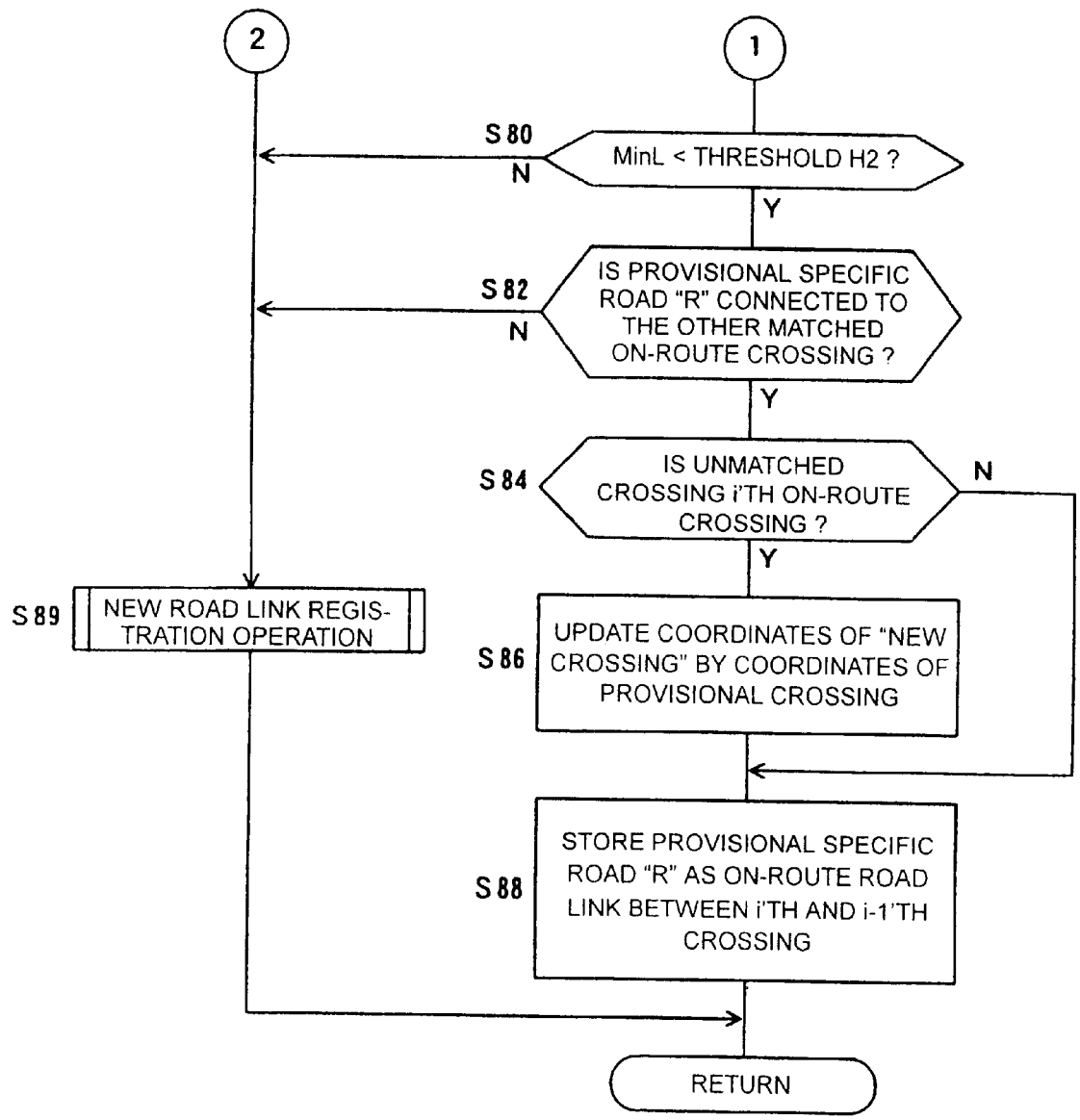

When the matching operation has not been successfully made with respect to the i–1'th crossing ("No" at S40), the sub-routine for the new crossing/road link registration operation shown in FIG. 16 and FIG. 17 is executed (at S52), and the procedure is returned to the main routine.

In summary, the new crossing/road link registration operation shown by the flowchart of FIG. 16 and FIG. 17 is executed when one or both of the i–1'th and i'th crossings has no corresponding crossing data in the road information memory 1032, whereby said one or both of the crossing not existing in the road information memory 1032 should be newly registered in said memory. In this case, the road link between the i–1'th and i'th crossings, at least one of which is not stored in the road information memory 1032, is absent in said memory, so that said road should also be newly registered in said memory.

Referring specifically to the flowchart of FIG. 16 and FIG. 17, the arithmetic processing unit 101 judges at S60 if both of the i–1'th and i'th crossings have been failed to be matched in the matching operation of the flowchart of FIG. 15. If only one crossing has been failed to be matched ("No" at S60), said one crossing is identified as a crossing J (at S62). This is applicable to a case wherein the matching operation has succeeded with respect to the i−1'th crossing but not with respect to the i'th crossing (which occurs at S32) and another case wherein the matching operation has succeeded with respect to the i'th crossing but not with respect to the i−1'th crossing (which occurs at S52). In the former case, the i'th crossing is identified as the crossing J at S62. In the latter case, the i−1'th crossing is identified as the crossing J at S62.

The arithmetic processing unit 101 determines minL having a sufficiently large value of 10,000 m, for example (at S64).

The arithmetic processing unit 101 then judges whether or not the unmatched crossing J is located on the road link stored in the map information memory 1031 of the navigation apparatus 100. For this judgment, at first, it retrieves one (a road link R) of the road information within the block stored in the roar data file (FIG. 4) at S66.

It then retrieves the node data (FIG. 5) of the retrieved road link R to determine the node N1 nearest to the crossing J and the node N2 nearest but one to the crossing J (at S68), and calculates the shortest distance between the crossing J and the N1–N2 segment (a length of a perpendicular line drawn from the crossing J toward the N1–N2 segment) to be L (at S70).

The arithmetic processing unit 101 compares the values of minL and L (at S72). When L is smaller than minL ("Yes" at S72), it may be provisionally supposed that the point of intersection between the perpendicular line and the N1–N2 segment is nearest to the crossing J, so that it replaces the value of minL with the value of L. Then the road R is determined as a provisional specific road and the coordinates of the point of intersection between the perpendicular line and the N1–N2 segment is determined as provisional crossing coordinates (at S74). When, on the other hand, L is equal to or larger than minL ("No" at S72), S74 is skipped because said point of intersection is not the nearest point to the crossing J.

At S76, the arithmetic processing unit 101 judges if all of the roads in the block have been checked. If there is any unchecked road in the block ("No" at S76), it is subjected to S66–S76 in the same manner as described above. If all of the roads have been checked ("Yes" at S76), it judges if minL is smaller than a second threshold H2 (at S80). In other words, it is judged at S80 if the crossing is located on the provisional specific road R. When the crossing J is located within a predetermined distance of error (H2) from the provisional specific road R, it is determined that it is located on the road R.

If minL is smaller than the second threshold H2 ("Yes" at S80), the arithmetic processing unit 101 judges if the provisional specific road R is connected to one of the on-route crossings which has been successfully matched (at S82). More particularly, the i'th crossing is the unmatched crossing in the first case (at 832 of the flowchart of FIG. 14) so that the arithmetic processing unit 101 judges if the starting point of the provisional specific road R correspond with the i−1'th crossing, at S82. In the second case wherein the i−1'th crossing is the unmatched crossing (at S52 of the flowchart of FIG. 15), the arithmetic processing unit 101 judges if the terminating point of the provisional specific road R agrees with the i'th crossing, at S82.

When the provisional specific road R is connected to the matched crossing ("Yes" at 882), the arithmetic processing unit 101 judges if the unmatched crossing is the i'th crossing (at S84). When the unmatched crossing is the i'th crossing ("Yes" at S84) which is applicable to the first case, the coordinates of the i'th crossing which have been stored in the drive route memory area 1032 at S30 in FIG. 14 is replaced by the provisional crossing coordinates determined at S74 (at S86).

When the unmatched crossing is the i−1'th crossing ("No" at S84) which is applicable to the second case, S86 is skipped because the necessary procedure has already been completed through the preceding new crossing/road link registration operation.

In this case, the unmatched crossing J is located on the provisional specific road R. Accordingly, the arithmetic processing unit 101 stores the provisional specific road R between the i'th crossing and the i−1'th crossing as a road link therebetween in the drive route memory area 1032 (at S88), and the procedure is returned to the main routine.

When both crossings have failed to be matched ("Yes" at S60), when minL is equal to or larger than the second threshold H2 meaning that the crossing J is not located on or around the provisional specific road R ("No" at S80) or when the crossing J is located on or around the provisional specific road R but the starting or terminating point of the provisional specific road R does not correspond with the matched crossing ("No" at S82), the new road link registration operation is executed at S89 and the procedure is returned to the main routine.

Figure 18:
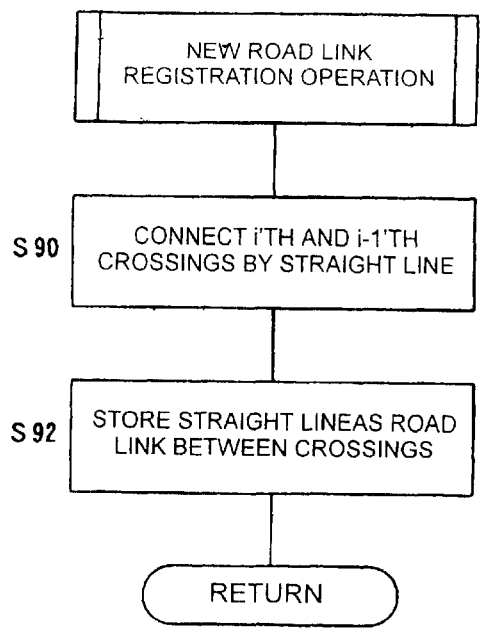
FIG. 18 is a flowchart of a sub-routine for the new road link registration operation.

FIG. 18, is a flowchart of the new road link registration operation executed at S50 in FIG. 15 and at S89 in FIG. 17. This operation is executed when a road link between the crossings specified in the matching operation or a road link containing the crossing specified in the matching operation is not existing in the present road data in the map information memory 1031, so that said road link is registered in the map information memory 1031 as a new road data.

The arithmetic processing unit 101 connects the crossing corresponding to the i'th on-route crossing and the crossing corresponding to the i−1'th on-route crossing by a straight line (at S90). It stores said straight line as a road link connected between said two crossings in the drive route memory area 1032 (at S92), and the procedure is returned to the main routine.

FIGS. 19–FIG. 24 are explanatory views illustrating the manner of the operation shown by the flowcharts of FIGS. 14–FIG. 18. In FIGS. 19–FIG. 24, the crossings e1 and e2 are the on-route crossings stored in the crossing specifying data transmitted from the center device 150, which are shown by "X" respectively. The crossing e1 is the i−1'th on-route crossing and the crossing e2 is the i'th on-route crossing. Shown by the mark "●" are the crossings E1 and E1 which are stored in the crossing data file (FIG. 3) in the map information memory 1031 of the navigation apparatus 100 corresponding to the on-route crossings e1 and e2, respectively. The road data file (FIG. 4) in the map information memory 1031 stores the road links R1 and R2 shown by solid lines, respectively.

A circle H1 has a center at the crossing e1, e2 with a radius of H1 which is the first threshold. When the crossing E1, E2 is located within the circle H1, it is determined that the on-route crossing e1, e2 is successfully matched with the crossing E1, E2. Then the matched crossings E1, E2 is specified as the on-route crossings corresponding to e1, e2 and stored in the drive route memory area 1032.

Figure 19:
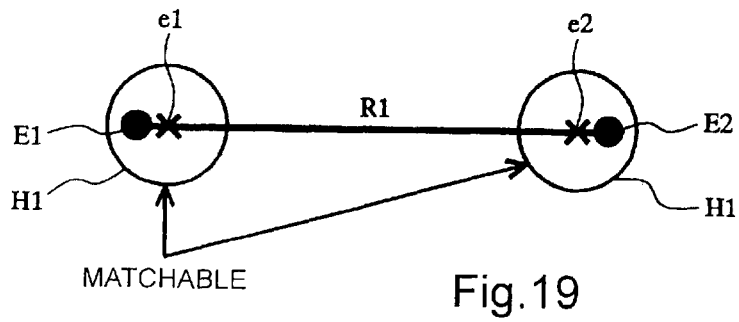
FIG. 19 is an explanatory view showing, by way of an example, the manner of specifying the crossing and the road link therebetween by the navigation apparatus.

FIG. 19 shows an example where both of the on-route crossings e1, e2 received from the center device 150 can be matched with the crossings E1, E2 in the navigation apparatus 100 (at S24–S28). As shown, the crossings E1 and E2 are both located within the circles H1. Therefore, the crossing identification code or number (E1, E2) are stored in the drive route memory area 1032 as the on-route crossings at S26 and the road link R1 therebetween is stored as part of the drive route at S46.

Figure 20:
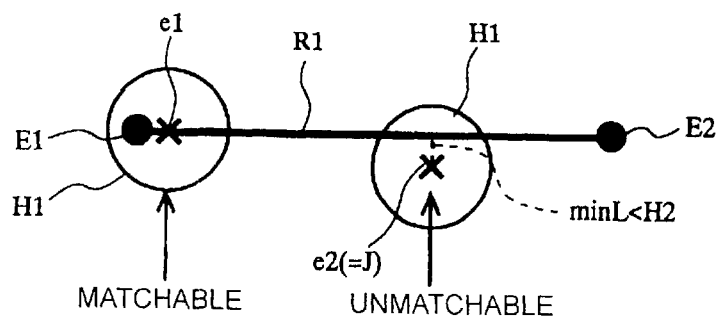
FIG. 20 is an explanatory view showing, by way of another example, the manner of specifying the crossing and the road link therebetween by the navigation apparatus.

In FIG. 20, the on-route crossing e1 received from the center device 150 can be matched with the crossing E1 in the navigation apparatus 100 but the other on-route crossing e2 can not be matched with the crossing E2 (at S32→S86→S88). This is an example of the above-described first case. As shown, the crossing E1 is located within the circle H1 having the center at e1 but the crossings E2 is located outside of the circles H1 having the center at e2. In this cases the on-route crossing e2 is regarded as a new crossing so that the coordinates thereof are stored in the navigation apparatus 100 at S30.

In the example shown in FIG. 20, a distance minL between the on-route crossing e2 and the provisional specific road R1 (shown by dotted line) is smaller than the second threshold H2 ("Yes" at S80), the provisional specific road R1 is connected to the crossing E1 corresponding to the matched on-route crossing e1 ("Yes" at S82), and the i'th on-route crossing e2 is the unmatched crossing J ("Yes" at S84). Accordingly, the coordinates of the on-route crossing e2 which have been stored as the new crossing at S30 are replaced with those of the intersection point between the perpendicular line and the provisional specific road R1 (at S86). Further, the road link between the matched crossing E1 and the intersection point is registered in the drive route memory area 1032 as new road link data.

Figure 21:
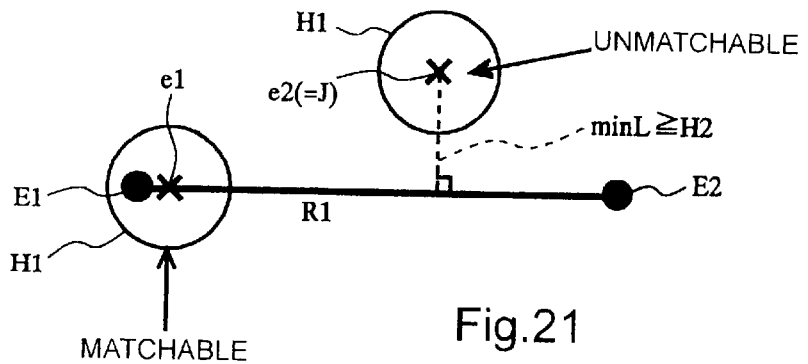
FIG. 21 is an explanatory view showing, by way of still another example, the manner of specifying the crossing and the road link therebetween by the navigation apparatus.

In FIG. 21, the on-route crossing e1 received from the center device 150 can be matched with the crossing E1 in the navigation apparatus 100 but the other on-route crossing e2 can not be matched with the crossing E2, and a distance minL (shown by dotted lines) between the on-route crossing e2 and the provisional specific road R1 is equal to or larger than the second threshold H2 (at S32→S80:N→S89). In this case, the coordinates of the unmatched on-route crossing e2 are registered in the drive route memory area 1032 as new crossing data. Further, between the matched crossing E1 and the unmatched crossing e2 is drawn a straight line, which is registered in the drive route memory area 1032 as a new road link therebetween, in the sub-routine of the new road link registration operation at S89.

Figure 22:
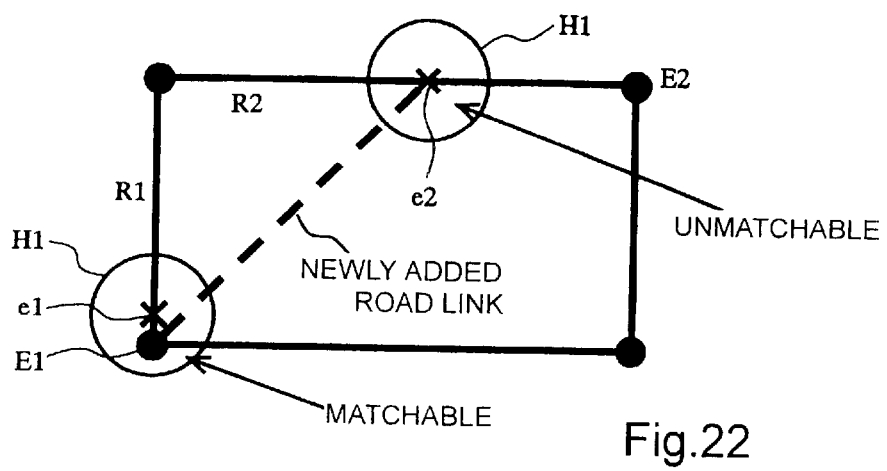
FIG. 22 is an explanatory view showing, by way of still another example, the manner of specifying the crossing and the road link therebetween by the navigation apparatus.

In FIG. 22, the on-route crossing e1 received from the center device 150 can be matched with the crossing E1 in the navigation apparatus 100 but the other on-route crossing e2 can not be matched with the crossing E2, and the on-route crossing e2 is located on or around the provisional specific road R2 which is not connected to the crossing E1 corresponding to the i−1'th on-route crossing e1 (at S32→S82:N→S89). In this case, a straight line is drawn between the matched crossing E1 and the unmatched crossing e2, shown by a dashed line in FIG. 22, and the line is registered in the drive route memory area 1032 as a new road link therebetween, in the sub-routine of the new road link registration operation at S89.

Figure 23:
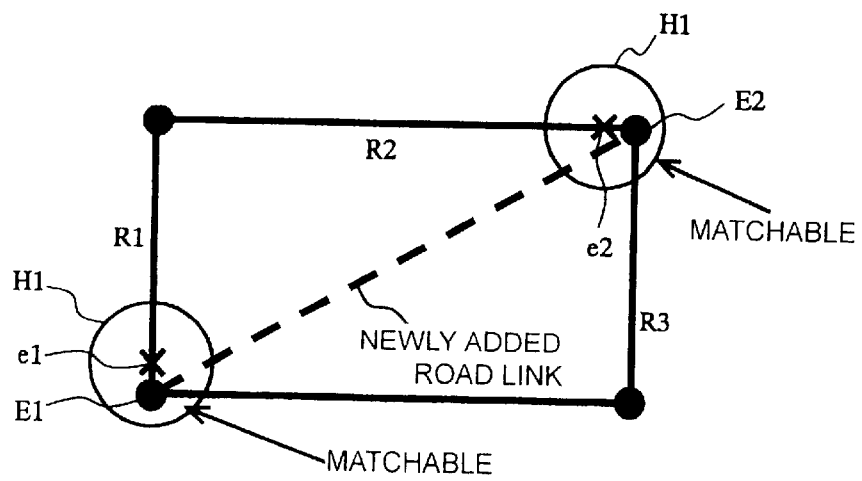
FIG. 23 is an explanatory view showing, by way of still another example, the manner of specifying the crossing and the road link therebetween by the navigation apparatus.

In FIG. 23, both the on-route crossings e1, e2 received from the center device 150 can be matched with the crossings E1, E2 in the navigation apparatus 100, but none of the road links R2, R3 terminating at the crossing E2 corresponding to the i'th on-route crossing e2 has the other end (starting point) at the crossing E1 corresponding to the i−1'th crossing e1 (at S28→S44:N→S48:N→S50). In this case, a straight line is drawn between the matched crossing E1 and E2, shown by a dashed line in FIG. 23, and the line is registered in the drive route memory area 1032 as a new road link therebetween, in the sub-routine of the new road link registration operation at S50.

Figure 24:
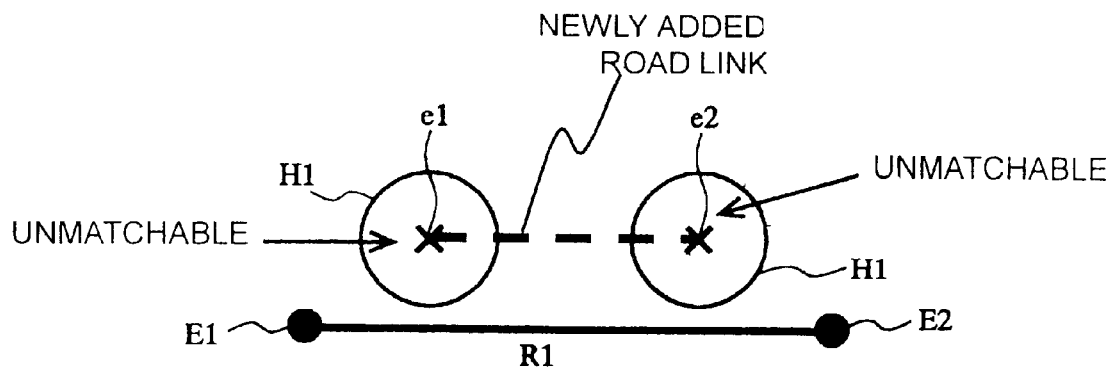
FIG. 24 is an explanatory view showing, by way of still another example, the manner specifying the crossing and the road link therebetween by the navigation apparatus.

In FIG. 24, both the on-route crossings e1, e2 received from the center device 150 can not be matched with the crossings E1, E2 in the navigation apparatus 100 (at S30→S32→S60:Y→S89). In this case, the unmatched crossings e1, e2 are regarded as new crossings, a straight line is drawn therebetween, shown by a dashed link in FIG. 24, and the line is registered in the drive route memory area 1032 as a new road link, in the sub-routine of the new road link registration operation at S89.

As noted from the foregoing description, the recommended drive route information that the navigation apparatus 100 receives from the center device 150 comprises only the coordinates of the on-route crossings. This reduces the data volume to be transmitted from the center device 150, which is particularly advantageous when data transmission is made using a packet switching technique. The reduced data volume in transmission results in a reduction in transmission period, which is also advantages when data transmission is made using a circuit switching technique.

Because the map information memory 1031 in the navigation apparatus 100 is not so much frequently updated as compared with the map information memory 1531 in the center device 150, it is possible that the received on-route crossing can not be matched with any of the crossings stored in the map information memory 1031. It is also possible that the navigation apparatus 100 can not identify any road link between the received on-route crossings. In the above-described embodiment, the navigation apparatus 100 may determine new crossings and/or road links based on the received crossing coordinates, which are additionally registered in the own memory. Accordingly, even when the map data stored in the map information memory 1031 of the navigation apparatus 100 have the contents (crossing data files, road data files) different from those of the map data stored in the map information memory 1531 of the center device 150, the navigation apparatus 100 may reproduce the drive route to the destination, which has been determined by the center device 150, from the coordinates sequence of the on-route crossings received from the center device 150. Therefore, the user of the navigation apparatus is guided to the destination along the reproduced drive route.

The navigation apparatus 100 determines the drive route in accordance with the coordinates of the on-route crossings, and no further data is required in determination or reproduction of the drive route by the navigation apparatus 100. This means that the navigation apparatus 100 may execute the matching operation even if there is any difference or discrepancy between the format or version of the data in the navigation apparatus 100 and in the center device 150.

The above-described first embodiment may be subjected to various modifications as far as they pertain within a scope of the invention defined in the appended claims.

For example, when any road link can not be specified between the crossings, in the above-described first embodiment, the new road link is determined by connecting the on-route crossings by a straight line in the new road link registration operation shown in FIG. 18. However, in this case, the navigation apparatus 100 sends to the center device 150 a request to transmit the road information between the crossings. In response to the request, the center device 150 transmits the road information to the navigation apparatus 100, and the navigation apparatus stores the transmitted data in the drive route memory area 1032. The road information transmitted from the center device may comprise the node sequence of the road link.

Although the map information memory 1031 of the navigation apparatus 100 includes the crossing data file (FIG. 3) in the above-described first embodiment, it is not always necessary. Even when the map information memory 1031 consists of the road data (and the node data) and includes no crossing data, the navigation apparatus 100 recognizes a point of intersection between two road links as a crossing. The coordinates of the intersection may be as the crossing data.

The crossing specifying data transmitted from the center device 150 to the navigation apparatus 100 comprises the sequence of the coordinates of the on-route crossings in the above-described first embodiment, but it may further include appendant information. The appendant information may be used by the navigation apparatus 100 to facilitate the route specifying operation (matching operation). The appendant information may also be used in the route guidance operation.

More particularly, the appendant information may comprise one or a combination of (a) the codes or numbers identifying the crossings and/or road links; (b) the road coordinates (the coordinates of nodes on the road, for example); (c) the guidance information specifying the crossings at which route guidance is carried out and their attribute information; and (d) the detailed guidance information (such as landmark information).

FIG. 5(*a*) is a flowchart showing the operation to be executed by the center device 50, when the crossing specifying data transmitted from the center device 50 to the navigation apparatus 100 includes the appendant information, which corresponds to the flowchart of FIG. 8 to be executed when the crossing specifying data does not include the appendant information.

As shown, after extracting the on-route crossings at S8, the system control unit 152 adds the appendant information (at S8*b*) and transmits the crossing specifying data comprising the sequence of the coordinates of the extracted crossings and the appendant information to the navigation apparatus 100 (at S9').

When the appendant information includes the crossing/road link identifying information, the navigation apparatus 100 may not execute the operation of FIGS. 14–FIG. 18. The navigation apparatus 100 may easily identify the crossings and the road links with their identification codes or numbers. However, when there is any difference or discrepancy between the format or version of the data in the navigation apparatus 100 and in the center device 150, the matching operation can not be made by using the crossing/road link identification codes or numbers. In such case, the navigation apparatus 100 is required to execute the operation shown in FIGS. 14–FIG. 18.

FIG. 25(*b*) shows an example wherein there are two road links between the same two crossings. When the navigation apparatus 100 receives only the coordinates of the two crossings, it is not possible to specify either one of the road links R1, R2. When the road coordinates are included as the appendant information, one of the road links R1, R2 is easily specified.

The road coordinates may also be used in the new road link registration operation. In the above-described first embodiment, when no road data between the two crossings is stored in the map information memory 1031, the navigation apparatus 100 determines a new road link by drawing a straight line between the two crossings. But the actual road corresponding to the determined road link may not be straight. When the navigation apparatus 100 receives the road coordinates, it will be possible to make a new road link substantially equivalent to the shape of the actual road by respectively connecting the crossings and the road coordinates.

The landmark information may not be stored in the navigation apparatus. In this case, nevertheless, the navigation apparatus executes the route guidance operation with the landmark information transmitted from the center device as the appendant information.

The crossing and/or road link identification codes or numbers may be regarded as a part of the crossing specifying data. This modification also facilitates the matching operation by the navigation apparatus 100. Only when the matching operation can not be made due to a difference in format or version of the data in the navigation apparatus 100 and in the center device 150, the navigation apparatus 100 is required to execute the operation shown in FIGS. 14–FIG. 18.

In the above-described first embodiment, the navigation apparatus 100 can solely execute searching a route to the destination. However, the navigation apparatus 100 may no need to have the route searching operation, because it may reproduce the drive route which has been searched by the center device 150, by using the crossing specifying data transmitted therefrom.

In the above-identified first embodiment, the center device 150 operates, in response to receipt of the current position and the destination from the navigation apparatus 100, to search a route to the destination and prepare the crossing specifying data, which is sent back to the navigation apparatus 100. When the system is so designed that the center device 150 specifies location where a customer is waiting for a taxi or where a luggage is to be collected or delivered to a taxi driver or an express company, the navigation apparatus 100 may not transmit the current position and the destination to the center device 150.

(3) Summary of Second Embodiment

The second embodiment also relates to a communication navigation system wherein a navigation apparatus 100 mounted on a vehicle communicates with a center device 150 in an information center so that the navigation apparatus 100 executes route guidance operation with the help of information transmitted from the center device 150.

In accordance with the second embodiment, in a system wherein the center device 150 (i.e., a communicatory information center) executes route searching operation, the result of which is transmitted to the navigation apparatus 100 (i.e., a communicatory mobile data-processing unit mounted on the vehicle), it is possible to execute the route guidance operation even if there is a version difference between the road information stored in the navigation apparatus 100 and the road information stored in the center device 150. More particularly, the navigation apparatus 100 transmits version data of the road information stored it the navigation apparatus, and then the center device 150 compares a version of each data of a road link (or a predetermined unit comprising a series of the road links) on the searched route to the destination with the transmitted version data. When data of the same version are stored both in the center device 150 and in the navigation apparatus 100, the center device 150 transmits simply the road identification number or code. In this case, the navigation apparatus 100 executes the route guidance operation by retrieving the road attribute information from the own memory in reference to the road identification number or code transmitted from the center device 150.

When the data version in the center device 150 is newer than the data version in the navigation apparatus 100, the center device 150 transmits the road attribute information, as well as the road identification number or code, to the navigation apparatus 100. In this case, the navigation apparatus 100 executes the route guidance operation by using the road attribute information transmitted from the center device 150.

Accordingly, the navigation apparatus 100 may execute the route guidance operation by using the latest road data stored in the center device 150, even when such latest road data has not yet been stored in the navigation apparatus 100. The data volume to be transmitted from the center device 150 to the navigation apparatus 100 may be minimized.

(4) Detailed Description of Second Embodiment

The center device 150 and the navigation apparatus 100 are substantially the same as in the first embodiment shown in FIG. 1, except that they have different programs and data contents. Such differences will be described below in detail.

In the second embodiment, the road network data for use in the route searching operation is stored in the map information memory 1531 of the database 153 in the center device 150 in the information center. The road data comprises a plurality of the road network data.

The road network data comprises the road data files (FIG. 4) and the crossing data file (FIG. 3) in the first embodiment. However, in this embodiment, one road network data includes only one crossing data file. Accordingly, the crossing data file in this embodiment has no block specifying data such as shown in the left-most column in FIG. 3. The center device 150 stores th road network data of different versions. The center device 150 makes use of the road network data of the latest version to search a route to the destination. The center device 150 uses the road network data of older version when it is necessary to confirm whether the latest road attribute information of the road links on the searched route is stored in the navigation apparatus 100.

The center device 150 stores the result of route searching operation which comprises a sequence of the road identification number or code, and the road attribute information as route data files 1532. FIG. 26 is an example of the data table showing the result of route searching operation, and FIG. 27 is an example of the data table showing the road attribute information.

As shown in FIG. 26, a sequence of the road identification number or code of road links which constitute the route searched by the center device 150. Each road link has its version number shown in the right column in FIG. 26, which is shown merely for explanation and actually not stored in the route data file 1532.

As shown in FIG. 27, the road attribute information comprises the road identification number or code, the coordinate data for display and map matching, the number of lanes, the road link length, etc. for each road link which is not stored in the navigation apparatus 100. Data in the road attribute information is retrieved from the data file (FIG. 4).

In this embodiment, the result of route searching operation comprising a sequence of the road identification number or code, and the road attribute information, both temporarily stored in the route data files 1532, are transmitted to the navigation apparatus 100 for route guidance operation.

In the navigation apparatus of the second embodiment, as in the center device 150, the road network data for route searching operation is stored in the map information memory 1031 of the data memory 103. The version information (version identification number) of the road network data is also stored in the map information memory 1031.

The map information memory 1031 may comprise any suitable storage means, and most preferable one is a DVD-ROM. The version information of the road network data stored in the navigation apparatus 100 will be referred to as a DVD version in the following description.

The drive route memory area 1032 is located at a predetermined area on the RAM, as in the first embodiment, for storing the result of route searching operation (which may be referred to as a road ID sequence in the following description) and the road attribute information both transmitted from the center device 150. The route guidance operation is carried out based on the road ID sequence and the road attribute information stored in the drive route memory area 1032 and the road network data stored in the map information memory 1031.

The center device 150 and the navigation apparatus 100 will operate as follows in the second embodiment.

In the following description, the oldest version of the road network data is referred to as "1.00" which is updated to "1.05", then to "1.10" and then to "1.11" which is the latest version at this time. The road network data of these different versions are all stored in the center device 150. The navigation apparatus 100 which requests the center device 150 to search a route has the road network data of the DVD version 1.05.

FIG. 28 diagrammatically shows an example of the road network data of the latest version 1.11 stored in the center device 150 for some area, whereas FIG. 29 diagrammatically shows an example of the older version 1.05 stored in the navigation apparatus 100 for the same area. As shown by comparison between FIG. 28 and FIG. 29, the road network data of the latest version 1.11 shown in FIG. 28 has a new road link of ID No.7 which does not exist in the road network data of the older version 1.05 shown in FIG. 29. Since the new road link of ID No.7 is connected between an intermediate point on the existing road link of ID No.2 and another intermediate point on the existing road link of ID No.5 as shown in FIG. 29, it becomes necessary that the road link of ID No.2 in the old version 1.05 is divided into two links of ID No.10 and No.11 which appear in the latest version 1.11. Likewise, the road link of ID No.5 in the old version 1.05 is divided into two links of ID No.8 and No.9 as appearing in the latest version 1.11.

Figure 30:
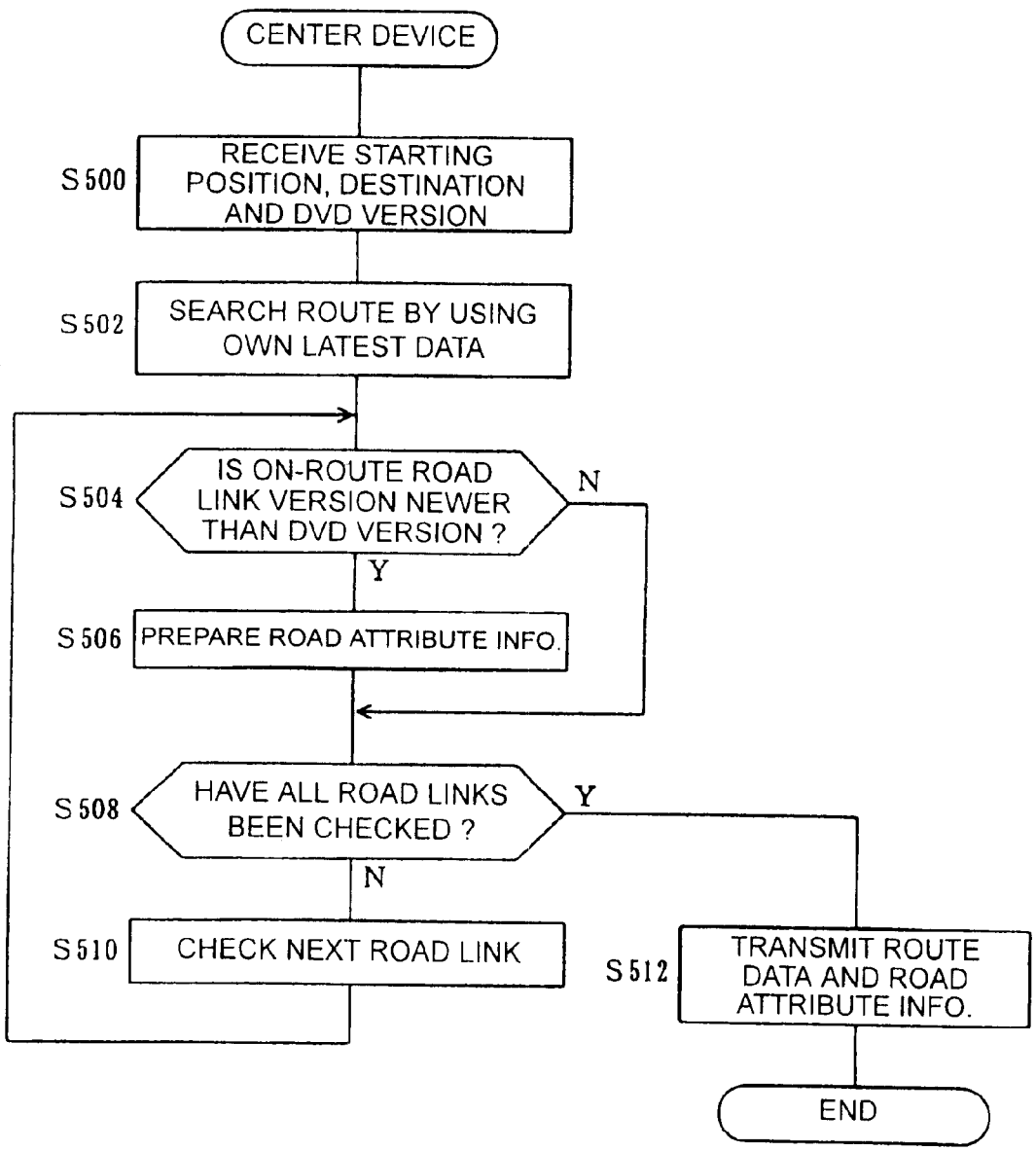
FIG. 30 is a flowchart showing the operation by the center device.

The center device 150 will operate as shown by the flowchart of FIG. 30. The system control unit 152 of the center device 150 awaits receipt of data transmission from the navigation apparatus 100 through wireless instrument such as a cellular phone using a packet or circuit switching technique. When receiving the starting point, the destination and the DVD version (version 1.05), the system control unit 152 stores these data in a predetermined area on the RAM (at S500).

The system control unit 152 starts searching a recommended route from the starting point to the destination by using the road network data of the latest version (version 1.11) stored in the map information memory 1531 (at S502). In the route searching operation by the system control unit 152, the information regarding time and point of occurrence of a traffic jam, traffic accident, road construction acquired by the external information collection unit 154 should also be considered so as to search a route which may detour such troublesome point.

It is supposed that the route searched at S502 comprises the road links of ID No.1, 10, 7, 8 and 6 in the order as shown by hatched lines in FIG. 28. As a result of this route searching operation, the road ID sequence is stored as shown by the data table of FIG. 26. This route searching operation was carried out in accordance with the road network data of the latest version 1.11, so that the searched route may contain one or more road links which are not stored in the roar network data of the older version 1.05 stored in the navigation apparatus 100. In this example, the road links of No.10, No.7 and No.8 are not contained in the navigation apparatus 100. The system control unit 152 judges whether or not each road ID number on the searched route is stored in the map information memory 1031 of the navigation apparatus 100 (at S504). When the searched route comprises the road links of ID No.1, 10, 7, 8 and 6 in the order as shown in FIG. 28, it is judged at first whether or not the road link of ID No.1 is stored in the memory 1031. This judgment may be made by referring to the road network data stored in the memory 1531 of the version identical to the DVD version (1.05) received from the navigation apparatus 100 at S500, to confirm whether or not the road link of ID No. 1 is contained therein. In this example, the road link of ID No. 1 is already contained in the road network data of version 1.00 (see FIG. 26) which is of course contained in the road network data of the DVD version 1.05 in the memory 1031 of the navigation apparatus 100 ("No" at S504). Accordingly, the road ID No.1 is stored in a transmission buffer. The road attribute information is not prepared in this case, so that S506 is skipped.

Next, at S508, it is judged whether or not all of the road links on the searched route have been checked. Since only the road ID No.1 has been checked ("No" at S508), the next road ID No.10 is retrieved (at S510) and subjected to the version check at S504. As shown in FIG. 26, the road ID No.10 is added at the time of up-version from 1.05 to 1.10 and, therefore, not contained in the road network data of the DVD version 1.05 in the navigation apparatus 100. Accordingly, it is judged that there is no road ID in the memory 1031 corresponding to the road ID No.10 ("Yes" at S504) and the road attribute information is prepared (at S506).

At S506, in order that the navigation apparatus 100 executes the route guidance operation wherein the road ID No.10 not existing in the memory 1031 is represented in the display 106, along which the user of the navigation apparatus is guided to the destination, the system control unit 152 prepares the attribute information of the road ID No.10 in reference to the road data file (FIG. 4) and stores the same in the route data file 1532 as shown by example in FIG. 27. The road attribute information prepared at S506 is stored in the transmission buffer.

In this example, the road ID No.7 and No.8 are not stored in the road network data of the DVD version 1.05 in the memory 1031. Accordingly, through S504–S510, the attribute information regarding these road links are prepared and stored in the route data file 1532 and in the transmission buffer, as in the same manner described above in connection with the road ID No.10.

Regarding the road ID No.6 which is contained also in the road network data of the DVD version 1.05 in the memory 1031 ("No" at S504), this road ID No.6 is stored in the transmission buffer, without necessity of preparing the road attribute information.

After all of the road links on the route have been checked ("Yes" at S508), the road ID sequence (the road specifying data) and the road attribute information stored in the transmission buffer are transmitted to the navigation apparatus 100 (at S512). In this example, the road ID numbers for all of the road links (the road ID sequence) and the road attribute information regarding the road ID No.10, No.7 and No.8 are transmitted to the navigation apparatus.

Figure 31:
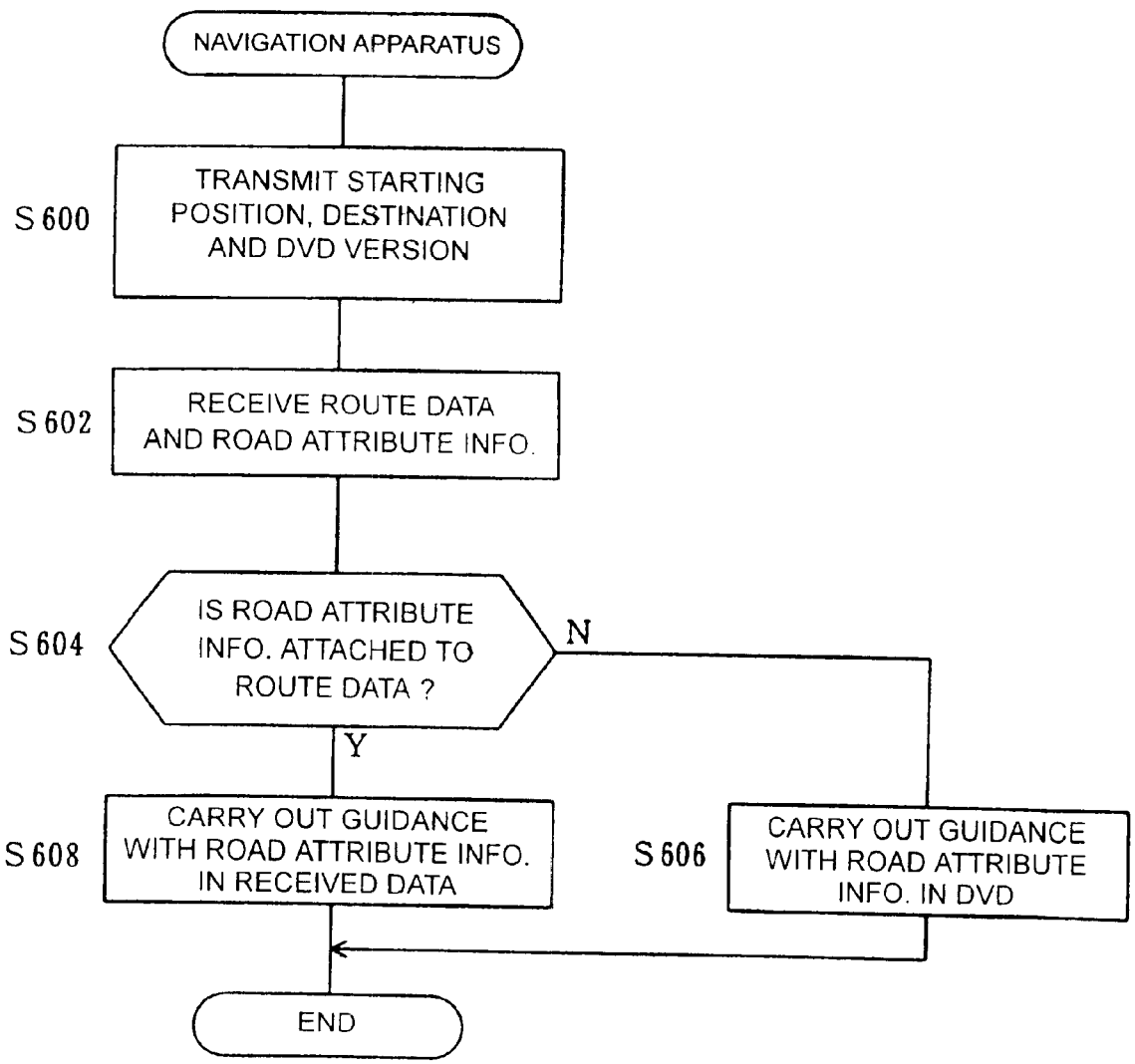
FIG. 31 is a flowchart showing the operation by the navigation apparatus.

The navigation apparatus 100 will operates as shown by the flowchart of FIG. 31. The arithmetic processing unit 101 of the navigation apparatus 100 transmits the starting point, the destination and the DVD version to the center device 150 to request route searching operation (at S600). As described above, in response to this request, the center device 150 prepares the searched route and the road attribute information, which are transmitted to the navigation apparatus (at S512 of the flowchart of FIG. 30). The navigation apparatus 100 stores the received data in the drive route memory area 1032 (at S602).

The arithmetic processing unit 101 judges whether or not the received route information (the road ID sequence) is accompanied by the attribute information (at S604). When there is no attribute information ("No" at S604), which means that all of the road data corresponding to the received road ID are stored in the map information memory 1031, the arithmetic processing unit 101 execute the route guidance operation by using said road data (FIG. 4).

When there is some attribute information ("Yes" at S604), which means that some of the received road ID is not contained in the map information memory 1031, the arithmetic processing unit 101 executes the route guidance operation by using the received road attribute information in combination with the road data in the map information memory 1031. More particularly, with respect to the road link which can be specified by its ID number (the road ID No.1 an No.6 in this example), the arithmetic processing unit 101 retrieves its road attribute information from the road data file in the map information memory 1031 to prepare a segmental route ("No" at S604; S606). With respect to other road links (the road ID No.10, No.7 and No.8), the arithmetic processing unit 101 prepares a segmental route based on its road attribute information received from the center device 150 (S608). These segmental routes are connected with each other to prepare a complete route to the destination.

In accordance with the above-described second embodiment, the navigation apparatus 100 transmits the version information of the road network data stored therein, as well as the starting point and the destination, when requesting the route searching operation to the center device 150. The center device 150 searches a route by using the road network data of the latest version stored therein to prepare the road ID sequence. Also, the center device 150 judges whether or not each road ID is contained in the memory 1032 of the navigation apparatus 100 by reference to the version information received from the navigation apparatus 100. The road attribute information regarding the road ID not contained in the navigation apparatus 100 is prepared, and then transmitted to the navigation apparatus 100 together with the road ID sequence.

Accordingly, even if the road network data held in the navigation apparatus 100 and the road network data used in the route searching operation at the center device 150 have different versions and different contents, it is possible that the navigation apparatus 100 executes the route guidance operation in accordance with the road network data of the latest version.

The above-described second embodiment may be subjected to various modifications as far as they pertain within a scope of the invention defined in the appended claims.

The center device 150 may store only the road network data of the latest version instead of storing a plurality of road network data of different versions. In this modification, the center device 150 stores the road ID version data which is updated at every time of version updating and specifies the version number and the road ID to be added and/or deleted in this version. When, for example, the road network of FIG. 29 is updated to that of FIG. 28, the road ID version data is updated such that the road ID No.10, No.7 and No.8 are added as version 1.10 and the road ID No.2 and No.5 of version 1.05 are deleted.

In this modification wherein the center device 150 stores the road ID version data, it becomes unnecessary to store the road network data of older versions. Further, the version check at S504 may be processed speedily, because the system control unit 152 of the center device 150 simply retrieves the version for each road link of the road ID sequence from the road ID version data and compares said version with the received DVD version.

In the above-described second embodiment, the information center has the map data of latest version than that stored in the navigation apparatus. In a modified embodiment, the navigation apparatus has the image display data (such as icons indicative of remarkable facilities) of a specific version whereas the information center has the image display data of the latest version which contains, for example, icons indicative of newly-developed golf courses which are not contained in the image display data in the navigation apparatus.

It is supposed that a newly-developed golf course is added as the destination data in the information center. The image display data of the older version in the navigation apparatus has no data for displaying this golf course. When the navigation apparatus mounted on the vehicle solely uses the own image display data, a map of an area which should include this golf course is represented on the display 106 but the golf course itself can not be displayed, which makes it impossible for the user to confirm that the golf course (the destination) really exists within the displayed area.

To cope with this problem, in this modified embodiment, in response to receipt of the version information of the image display data in the navigation apparatus, together with a request for transmission of a selection menu for destination, the information center judges based on the own image display data of the latest version whether the image display data of an icon indicative of a newly-developed golf course is to be transmitted or not. When the version of the image display data in the navigation apparatus is older than that in the information center, it is judged that the image display data of the golf course indicating icon should be transmitted, so that said image display data is transmitted to the navigation apparatus together with the destination selection menu.

When the user selects said newly-developed golf course as the destination, the navigation apparatus operates to display a map of an area including this golf course based on the own image display data. At the same time, the golf course icon is shown on the displayed map in accordance with the image display data received from the information center. Accordingly, the user can confirm that there is the golf course where he wishes to go on the displayed map, even though this golf course data is not included in the own image display data.

Although the present invention has been described in conjunction with specific embodiments thereof, it is to be understood that it is capable of considerable variation and modification without departure from the scope of the appended claims.

The teachings of Japanese Application 11-328,881, filed Nov. 18, 1999, are incorporated herein in their entirety, inclusive of the specification, claims and drawings.

We claim:

1. A communication navigation system which includes an information center and a vehicle mounted navigation apparatus, in which data concerning a recommended route from a current location of the navigation apparatus to a destination is transmitted from the information center to the navigation apparatus, and then route guidance is carried out by the navigation apparatus using the data transmitted from the information center, wherein the navigation apparatus comprises:

road information storage means containing stored first road information including first road network data including a plurality of road links and first identification data of the first road information;

data transmitting means for transmitting data of a current location and a destination of the navigation apparatus and the first identification data to the information center;

data receiving means for receiving data of recommended route guidance information from the information center;

route guidance data generating means for generating route guidance data based on the first road information stored in the road information storage means and based on the recommended route guidance information transmitted from the information center; and route guiding means for guiding a user of the navigation apparatus from the current location to the destination of the navigation apparatus using the route guidance data; and wherein the information center comprises:

a database containing stored second road information including second road network data including a plurality of road links and second identification data of said second road information;

data receiving means for receiving the transmitted data of the current location and the destination of the navigation apparatus and the transmitted first identification data;

recommended route determining means for determining a recommended route, by extracting recommended road links from the second road network data stored in the database, from the current location to the destination received from the navigation apparatus, based on the second road information stored in the database;

judging means for judging respectively whether or not each recommended road link along the recommended route is contained in the first road information, by comparing the first identification data transmitted from the navigation apparatus with the second identification data of the road information stored in the database;

recommended route guidance information generating means for generating recommended route guidance information, based on the database, containing first enabling data enabling retrieval of first recommended road links from the road information storage means, the first recommended road links being those recommended road links judged to be contained in the first road information, and second enabling data enabling construction of second recommended road links, the second recommended road links being those recommended road links judged not to be contained in the first road information; and data transmitting means for transmitting said recommended route guidance information to the navigation apparatus.

2. The communication navigation system as claimed in claim 1, wherein the route guidance data generating means comprises:

(a) means for extracting recommended road links, specified by the transmitted first enabling data, from the first road information stored in the road information storage means in the navigation apparatus, and (b) means for reconstructing recommended road links by using the transmitted second enabling data enabling reconstruction of each recommended road links along the recommended route; and wherein said route guidance data generating means uses the means of (a) and/or (b) for generating the route guidance data.

3. The communication navigation system as claimed in claim 2, wherein the first road information stored in the road information storage means further includes first guidance data corresponding to the plurality of the road links, and the second road information stored in the database further includes second guidance data corresponding to the plurality of the road links, and the recommended route guidance information generating means generates the recommended route guidance information further containing the second guidance data corresponding to each recommended road link which is judged not to be contained in the first road information, and the route guidance data generating means generates the route guidance data as a combination of the second guidance data contained in the transmitted recommended route guidance information and the first guidance data extracted from the road information storage means.

4. The communication navigation system as claimed in claim 3, wherein both of the first guidance data stored in the road information storage means and the second guidance data stored in the database contain, for each road link, at least one of:
- data of a road length;
- data of coordinates for drawing;
- data of coordinates for matching a location of the navigation apparatus; and
- data of number of lanes.

5. The communication navigation system as claimed in claim 1, wherein both of the first identification data stored in the road information storage means and the second identification data stored in the database are version numbers of the corresponding first and second road information, the database has road information of all versions, the recommended route determining means determines the recommended route using road information of a latest version stored in the database, and the judging means judges whether or not each recommended road link along the recommended route is contained in the first road information, by comparing the latest version number with the version number transmitted from the navigation apparatus.

6. The communication navigation system as claimed in claim 1, wherein the first identification data stored in the road information storage means is a version number of the first road information, and each road link in the database contains a version number expressing a road information version, and the judging means judges whether or not each recommended road link along the recommended route is contained in the first road information, by respectively comparing the version number of each recommended road link with the version number transmitted from the navigation apparatus.

7. The communication navigation system as claimed in claim 1, wherein the information center further comprises external information acquisition means for acquiring latest traffic conditions and/or latest road conditions, and the recommended route determining means determines the recommended route from the current location to the destination of the navigation apparatus in consideration of the latest traffic conditions and/or the latest road conditions.

8. The communication navigation system as claimed in claim 1, wherein both of the data transmitting means and the data receiving means of the information center, and both of the data transmitting means and the data receiving means of the navigation apparatus are designed so as to communicate using a packet switching technique and/or a circuit switching technique.

9. A navigation apparatus which guides a user from a current location to a destination comprising:
- road information storage means for storing first road information which includes a plurality of road links and first identification data identifying the first road information;
- data transmitting means for transmitting data concerning the current location and the destination of the navigation apparatus and the first identification data to an information center;
- data receiving means for receiving data concerning recommended route guidance information from the information center;
- route guidance data generating means for generating route guidance based on the first road information and the recommended route guidance information; and
- route guiding means for guiding the user from the current location to the destination using the generated route guidance data;

wherein the first road information contains, for each road link, at least one of:
- data of road length;
- data of coordinates for drawing;
- data of coordinates for matching a location of the navigation apparatus; and
- data of number of lanes.

10. An information center, which receives/transmits data from/to a navigation apparatus having road information storage means containing stored first road information including a plurality of road links and first identification data identifying the first road information, said information center comprising:
- a database storing second road information including a plurality of road links and second identification data identifying the second road information;
- data receiving means for receiving data concerning a current location and a destination of the navigation apparatus and the first identification data transmitted from the navigation apparatus;
- recommended route determining means for determining a recommended route from the current location to the destination, and for identifying road links along the determined recommended route utilizing the second road information;
- judging means for judging respectively whether or not each identified road link is contained in the first road information, by comparing the first identification data with the second identification data;
- recommended route guidance information generating means for generating recommended route guidance information, based on the database, containing firs enabling data enabling retrieval from the first road information of those identified road links judged to be contained in the first road information and second enabling data enabling reconstruction of those identified road links judged not to be contained in the first road information; and
- data transmitting means for transmitting the generated recommended route guidance information to the navigation apparatus.

11. The information center as claimed in claim 10, wherein the second road information contains, for each road link, at least one of:
- data of a road length;
- data of coordinates for drawing;
- data of coordinates for matching a location of the navigation apparatus; and
- data of number of lanes.

* * * * *

UNITED STATES PATENT AND TRADEMARK OFFICE
CERTIFICATE OF CORRECTION

PATENT NO.     : 6,542,816 B1
DATED          : April 1, 2003
INVENTOR(S)    : Ito et al.

It is certified that error appears in the above-identified patent and that said Letters Patent is hereby corrected as shown below:

<u>Title page,</u>
Item [57], ABSTRACT, delete ABSTRACT and substitute therefor the attached ABSTRACT.

Signed and Sealed this

Tenth Day of February, 2004

JON W. DUDAS
*Acting Director of the United States Patent and Trademark Office*

ABSTRACT

A communication navigation system, wherein a navigation apparatus requests a recommended route from an information center and guides a user of the navigation apparatus to a destination by using recommended route guidance data received from the information center. The navigation apparatus transmits a version number for its stored road data to the information center. The information center prepares guidance data for a recommended route, using the latest road data held in the information center, and transmits the data to the navigation apparatus. When the information center transmits, as the guidance data, a type of data selected by comparing the version number received from the navigation apparatus with a version number for each road link along the recommended route. For each road link along the recommended route judged to be contained in the road data held in the navigation apparatus, the information center transmits only data to enable the road link to be identified in the road data held in the navigation apparatus. For a road link judged not to be contained in the road data held in the navigation apparatus, the information center transmits whole data for the road link. Therefore, the navigation apparatus can generate the route guidance data by extracting road link data, from its own road data, corresponding to the road link merely identified by transmitted data and by reconstructing road link data for other road links using the transmitted data. Accordingly, the navigation system is capable of executing route guidance based on the latest road data even if road data stored in the navigation apparatus is of an older version than that stored in the information center.

UNITED STATES PATENT AND TRADEMARK OFFICE
CERTIFICATE OF CORRECTION

PATENT NO.     : 6,542,816 B1
DATED          : April 1, 2003
INVENTOR(S)    : Yasuo Ito et al.

It is certified that error appears in the above-identified patent and that said Letters Patent is hereby corrected as shown below:

Delete the entire specification and substitute therefore the attached specification.

Signed and Sealed this

First Day of June, 2004

JON W. DUDAS
*Acting Director of the United States Patent and Trademark Office*

COMMUNICATION NAVIGATION SYSTEM

TECHNICAL FIELD

The present invention relates to a navigation system for guiding a user of a navigation apparatus from a current location to a destination and, more particularly to a communication navigation system wherein a navigation apparatus mounted on a vehicle receives a drive route to a destination from an information center or an external device by communication therebetween.

BACKGROUND OF THE ART

A navigation system has been widely used in vehicles to provide a recommended route from a current location to a destination, along which a user of the system may drive the vehicle. The navigation system stores destination data, road link data and map data The road link data is used for searching for a route from the current location to the destination. The current location of the vehicle is detected by a GPS receiver, for example. The systems refers to the current vehicle location and the searched route to guide the user by showing the direction in which the user should travel or by giving instruction as to which roads the user should take, for example "go straight" or "turn at a crossing ahead".

Recently, a communication navigation system has been developed, wherein a navigation apparatus mounted on a vehicle detects the current location and executes route guidance operations, whereas an information center, outside of the vehicle, searches a route to the destination and transmits the route to the navigation apparatus.

An example of the communication navigating system is proposed in Japanese patent laid-open publication No. 10-160497 wherein a guiding route is determined by the navigation apparatus mounted on the vehicle, based on the recommended route data which is prepared by the information center and transmitted therefrom to the navigation apparatus. In this system, the recommended route data comprises a series of index numbers, each index number specifying a particular road link from a road link database. Once the series of index numbers is transmitted to the navigation apparatus, the road links corresponding to the index numbers are extracted from a road links database in the navigation apparatus and guiding route data is generated by connecting the extracted road links. The system has the advantage of efficient data communication because of only transmitting a series of index numbers for road links along the recommended route, instead of transmitting whole data for recommended route such as coordinates, street names and number of lanes etc.

However, although the information center has the latest road links database, the navigation apparatus may not have a road link database the same as in the information center.

Accordingly, the series of index numbers transmitted from the information center may include one or more index numbers specifying road links which are only included in the latest version road link database in the information center but not in the road link database of an older version in the navigation apparatus. In such a case, the navigation apparatus is not able to determine a road link along the recommended route by using the transmitted series of the index numbers.

On the other hand, if the information center transmits whole data for recommended route, the user will owe high communication costs because of huge data volume transmitted.

SUMMARY OF THE INVENTION

It is a primary object of the present invention to provide a novel communication navigation system which is capable of executing route guidance even if the road links data stored in the navigation apparatus mounted on the vehicle is an older version than that stored in the information center, without increasing communication costs.

To achieve the above objects, in accordance with an aspect of the present invention, there is provided a communication navigation system which includes an information center and at least one navigation apparatus, in which data concerning a recommended route from a current location of the navigation apparatus to a destination is transmitted from the information center to the navigation apparatus, and then route guidance is carried out in the navigation apparatus using the data transmitted from the navigation center, wherein the navigation apparatus of the communication navigation system includes:

road information storage means which stores road information including at least road network data which is composed of data of plural road links, and identification data for the road information;

data transmitting means for transmitting at least data concerning a current location and a destination of the navigation apparatus and the identification data of the road information stored in the road information storage means, to the information center, data receiving means for receiving data concerning recommended route guidance information from the information center, route guidance data generating means for generating route guidance data based on the road information stored in the road information storage means and based on the recommended route guidance information transmitted from the information center, route guiding means for guiding a user of the navigation apparatus from the current location to the destination of the navigation apparatus using the route guidance data, wherein the information center of the navigation system includes:

a database containing stored road information including at least road network data for a road network which is composed of a plurality of road links and identification data for said road information;

data receiving means for receiving at least data concerning the current location and the destination of the navigation apparatus and the identification data for the road information stored in the road information storage means from the navigation apparatus;

recommended route determining means for determining a recommended route, by extracting road links of the road network stored in the database, from the current location to the destination received from the navigation apparatus used on the road information stored in the database;

judging means for judging respectively whether or not data for each road link along the recommended is contained in the road information stored in the road information storage means in the navigation apparatus, by comparing the identification data transmitted from the navigation apparatus and the identification data for the road information stored in the database;

recommended route guidance information generating means for generating recommended route guidance information, based on the database, containing data which enable to specify the each data of the road links along the recommended route from the road information stored in the road information storage means in a case where data for each of the road links is judged to be contained in the road information storage means by the judging means, and data which enables reconstruction of data for each of the road links along the recommended route without the road information stored in the road information storage means in a case where data for each of the road links is judged not to be contained in the road information stored in the road information storage means by the judging means; and data transmitting means for transmitting said recommended route guidance information to the navigation apparatus.

In a preferred embodiment of the present invention, the route guidance data generating means includes:

(a) means for extracting data of road links, which is specified by the transmitted data identifying the road links along the recommended route, from the road information storage in the road information stored means in the navigation apparatus, (b) means for reconstructing data of road links by using the transmitted data enabling reconstruction of data of each road link along the recommended route which is not contained in the road information storage means, and wherein the route guidance data generating means uses the means of (a) and/or (b) for generating recommended route guidance information.

In an example of the above preferred embodiment, the road information stored in the road information storage means further includes guidance data corresponding to the plurality of the road links, the road information stored in the database further includes guidance data corresponding to the plurality of the road links, the recommended route guidance information further contains guidance data corresponding to each of the road links which is judged not to be contained in the road information stored in the road information storage means, and the route guidance data generating means generates route guidance data by using the guidance data contained in the transmitted data of the recommended route guidance, and by further extracting guidance data, from the road information storage means, corresponding to each of the road links specified by the transmitted data of the recommended route guidance and judged to be contained in the road information storage means.

In this example, both of the guidance data stored in the road information storage means and the guidance data stored in the database contain, for each road link, at least one of:

data of a road length;

data of coordinates for drawing;

data of coordinates for matching a location of the navigation apparatus; and data of number of lanes.

In another preferred embodiment of the present invention, both of the identification data stored in the road information storage means and the identification data stored in the database are a version number of the roads information and the database has road information of all versions, and the recommended route determining means determines the recommended route using road information of the latest version stored in the database, and the judging means judges whether or not the each of the road links along the recommended route is contained in the road information stored in the road information storage means in the navigation apparatus, by comparing the version number of the latest road information being used for determining the recommended route and the version number transmitted from the navigation apparatus.

In still another preferred embodiment of the present invention, the identification data stored in the road information storage means is a version number of the road information, and the each data item for road links in the database contains a version number expressing a road information version added to the road information stored in the database, and the judging means judges whether or not data for each road link along the recommended route is contained in the road information stored in the road information storage means in the navigation apparatus, by respectively comparing the version number of each data item for the road links in the database with the version number transmitted from the navigation apparatus.

In still another preferred embodiment of the present invention, the information center further comprises external information acquisition means for acquiring the latest traffic conditions and/or latest road conditions, and the recommended route determining means determines the recommended route from the current location to the destination of the navigation apparatus in consideration of the latest traffic conditions and/or the latest road conditions.

In still another preferred embodiment of the present invention, both of the data transmitting means and the data receiving means of the information center, and both of the data transmitting means and the data receiving means of the navigation apparatus are designed so as to communicate using a packet switching technique and/or a circuit switching technique.

BRIEF DESCRIPTION OF DRAWINGS

The above and other objects of the present invention will become apparent from the following description when read in conjunction with the accompanying drawings in which:

FIG. 1 is a block diagram showing an overall arrangement of a route guidance system including the communication navigation system according to the first embodiment;

FIG. 2 is an explanatory view showing an example of the road network comprising crossings and road links;

FIG. 3 is an example of a data table showing the contents of a crossing data file containing data for the crossings shown in the road network of FIG. 2;

FIG. 4 is an example of a data table showing the contents of a road data file containing data for the roads shown in the road network of FIG. 2;

FIG. 5 is an example of a data table showing the contents of the node data file;

FIG. 6 is an explanatory view showing an example of the route data file;

FIG. 7 is a flowchart of the navigation program to be executed by the navigation apparatus mounted on the vehicle;

FIG. 8 is a flowchart of the route search and data transmission program to be executed by the remote information center;

FIG. 9 is an explanatory diagram showing the operation by the information center, by way of example;

FIG. 10 is an explanatory diagram showing the operation by the information center, followed by the operation of FIG. 9;

FIG. 11 is an explanatory diagram showing the operation by the navigation apparatus, in response to receipt of the crossing specifying data from the information center, FIG. 12 is an explanatory diagram showing the operation by the navigation apparatus, followed by the operation of FIG. 11;

FIG. 13 is an explanatory diagram showing the operation by the navigation apparatus, followed by the operation of FIG. 12;

FIG. 14 is a flowchart of a main routine for specifying the crossings and the roads which comprise the drive route, in accordance with the sequence of the coordinates of the on-route crossings (the crossing specifying data) received from the information center, FIG. 15 is a flowchart of a subroutine for the road link specifying operation;

FIG. 16 and FIG. 17 show a flowchart of a sub-routine for the new crossing/road link registration operation;

FIG. 18 is a flowchart of a sub-routine for the new road link registration operation;

FIG. 19 is an explanatory view showing, by way of an example, the manner of specifying the crossings and the road link therebetween by the navigation apparatus;

FIG. 20 is an explanatory view showing, by way of another example, the manner of specifying the crossings and the road link therebetween by the navigation apparatus;

FIG. 21 is an explanatory view showing, by way of still another example, the manner of specifying the crossings and the road link therebetween by the navigation apparatus;

FIG. 22 is an explanatory view showing, by way of still another example, the manner of specifying the crossings and the road link therebetween by the navigation apparatus;

FIG. 23 is an explanatory view showing, by way of still another example, the manner of specifying the crossings and the road link therebetween by the navigation apparatus;

FIG. 24 is an explanatory view showing, by way of still another example, the manner of specifying the crossings and the road link therebetween by the navigation apparatus;

FIG. 25 is a flowchart for appending additional information to the crossing specifying data in the route search and data transmission operations by the information center, FIG. 26 is an example of a data table showing the contents of the searched route stored in the map information memory of the information center in accordance with a second embodiment of the present invention;

FIG. 27 is an example of a data table showing the contents of the road attribute information stored in the map information memory of the information center in the second embodiment;

FIG. 28 is an explanatory view showing an example of the road network of the latest version 1.11 stored in the information center, FIG. 29 is an explanatory view showing an example of the road network of the older version 1.05 stored in the navigation apparatus;

FIG. 30 is a flowchart showing a program executed by the information center, and FIG. 31 is a flowchart showing a program executed by the navigation apparatus.

DESCRIPTION OF THE EMBODIMENTS OF THE INVENTION

Preferred embodiments of the present invention will be described with reference to the accompanying drawing FIGS. 1–31.

(1) Summary of First Embodiment

In a first embodiment, the crossing specifying data received from an external source is used to generate corresponding route data, by which route guidance is executed. In this embodiment, a route may be determined even when the navigation apparatus has no crossing or road data corresponding to the route data acquired from the external source, so that route guidance may be executed.

An information center serves as the external source and searches a recommended route to a destination, the identity of which is transmitted from the navigation apparatus, and extracts crossings located on the recommended route to prepare the crossing specifying data which comprises a series of coordinates of the on-route crossings. The crossing specifying data is transmitted to the navigation apparatus.

After transmitting the destination to the information center, the navigation apparatus receives the crossing specifying data. The navigation apparatus then matches the coordinates of the on-route crossings contained in the crossing specifying data with the coordinates of crossings stored in its own road network data to specify each of the on-route crossings. The coordinates of any on-route crossing which can not be thus matched should be stored as new crossing data in the navigation apparatus.

Then, the navigation apparatus specifies every road link between two adjacent on-route crossings from its own road data When no road link is found between the two adjacent crossings, these crossings are connected to each other by a straight line, which is stored as a new road link its own road data.

As above described, even when there is no data (crossings, road links) in the road network data corresponding to the on-route crossings transmitted from the information center, the navigation apparatus creates the corresponding data, which makes it possible to determine a drive route. In other words, even when there are differences between the road network data in the information center and that in the navigation apparatus, the navigation apparatus can generate route guidance data corresponding to the determined drive route, and can carry out route guidance using the generated route guidance data. In the first embodiment, determination of the drive route depends only on the coordinate data of the on-route crossings. This minimizes the time and cost required for communication with the information center.

The road network data in the information center is updated as new crossing/road data is collected. In contrast, the road network data in the navigation apparatus usually has a fixed content, unless replaced with a new version. Newer versions cannot be installed in some types of navigation apparatus. This will result in a difference between the road network data in the information center and that in the navigation apparatus.

Nevertheless, in accordance with the first embodiment, the navigation apparatus can specify the drive route by using the crossing specifying data transmitted from the information center, and therefore execute the route guidance.

(2) Detailed Description of First Embodiment

FIG. 1 shows an overall arrangement of a route guidance system including the information center (or "center device" or "central apparatus") and navigation apparatus according to the first embodiment.

The route guidance system shown in FIG. 1 comprises a navigation apparatus 100 mounted on a vehicle and a remote information center 150 which is communicable with a plurality of the navigation apparatuses 100.

The navigation apparatus 100 has an arithmetic processing unit 101, a program storage 102, a data memory 103, a current location sensor 104, an input device 105, a display unit 106, a voice output unit 107 and a communication unit 108.

The information center 150 has a communication unit 151, a system processing unit 152, a database 153 and an external information collection unit 154.

The arithmetic processing unit 101 has a CPU for executing various operations, including issuance of a request for transmission to the information center 150 of a destination and a request of return transmission of the crossing specifying data, matching of the crossing coordinates series and map information in accordance with the received crossing specifying data (FIG. 14), road link specifying (FIG. 15), new crossing/road link registration (FIG. 16 and FIG. 17), new road link registration (FIG. 18), route guidance and route searching for a route which may be used solely at the navigation apparatus.

The program storage 102 stores various programs and data for use in 5 execution of the above operations by arithmetic processing unit 101. The program storage 102 may be a ROM or other suitable storage means.

The data memory 103 may be a RAM, CD-ROM, flash memory, DVD-ROM (digital versatile disc ROM), hard disc or other suitable storage means. The data memory 103 includes a map information memory 1031 and a drive route memory 1032.

The map information memory 1031 may be a CD-ROM, DVD-ROM, hard disc or other storage means of a greater storage capacity. The map database stored in the map information memory 1031 includes crossing data files storing crossing data, road data files storing road data and node data files storing node data. The road network data comprises the crossing data, the road data and the node data.

FIG. 2 shows an example of the road network comprising four crossings indexed by the crossing numbers I–IV and eight road links indexed by the road numbers 1–8. From the example shown in FIG. 2, the files stored in map information memory 1031 will be described below.

FIG. 3 is a data table showing the contents of one crossing data file containing the crossing data of the crossings J–IV shown in the road network of FIG. 2. As shown, crossings located within a predetermined rectangular block are stored in one crossing data file. Each block is defined by the coordinates (x, y) and (x', y') of diagonal points. Such a manner of storage of the crossing data will better facilitate the matching operation as compared with storage of all of the crossing data are stored in a single file.

As shown in FIG. 3, the crossing data file stores the crossing data for each of the crossings I–TV. The data for each crossing includes the crossing number, name, latitude, longitude, the smallest road link number among road links starting at this crossing, the greatest road link number among roads terminating at this crossing, and signal presence (whether or not there is a signal at the crossing).

FIG. 4 is a data table showing the contents of one road data file containing the road data for roads 1–8 shown in the road network of FIG. 2. As shown, the road data file stores the road data for each of the road links 1–8. The data for each road includes the crossing number at the starting point, the crossing number at the terminating point, the next road link number having the same starting point, the next road link number having the same terminating point, road width, prohibit information, guidance invalidation information, speed limit, the number of nodes, the head address of node sequence data, and road link length.

FIG. 5 is a data table showing an example of the contents of the node data file. As shown, the node data files stores node data for crosswalks, tunnels and other remarkable points on the road link. The node data comprises the latitude, longitude and attribute. Each road comprises a series of nodes. The node data specifies a point on the road link. The road link is represented by connecting two adjacent nodes. For example, the No. 1 road link in FIG. 2 includes 15 nodes and starts from the node of No. 100 address (FIG. 4), which means that this road link comprises the nodes of No. 100–114 addresses.

The drive route memory area 1032 in the data memory 103 is preserved at a predetermined area of a RAM, for storing the crossing specifying data received from information center 150. As described before, the navigation apparatus 100 prepares a drive route in accordance with the crossing specifying data. The prepared drive route is also stored in the drive route memory area 1032. The RAM is also used as a working area for execution of the various programs by the arithmetic processing unit 101 and reading and writing of necessary data in communication with the information center 150.

The current location sensor 104 has a GPS receiver which receives radio waves from plural earth satellites to determine absolute coordinates of the current vehicle location. The current location sensor 104 may also have a speed sensor and a compass, both used for inertial navigation. These sensors detect a relative location of the vehicle which may be used to determine the current vehicle location in a case where no radio waves are receivable by the GPS receiver or where the vehicle is running through a tunnel. The relative vehicle location may also be used to eliminate an error of the absolute vehicle location detected by the GPS receiver.

The input device 105 may comprise a touch panel attached to a front panel of display 106. In data inputting operation with the touch panel, a touch by the user's finger on a particular icon shown on the display 106 will input corresponding data or command Another example of the input device 105 is a voice input unit employing a microphone and a voice recognizing unit. The user's voice through the microphone is recognized by the voice recognizing unit so that corresponding data or command is thereby input.

The display unit 106 may comprise a liquid crystal display (LCD) or a cathode-ray tube (CRT) for display of a road map and the details around the crossing in the route guidance operation. Input key images corresponding to the above-described touch panel are also shown on the display 106.

The voice output unit 107 includes a voice synthesizer and speakers. During the route guidance to the destination, the voice synthesizer prepares voice guidance data such as "Turn right at the crossing 100m ahead", for example, which is output through the speakers. The speakers connected to an audio instruments mounted on the vehicle may be used for this purpose. Another speaker set may be attached on the driver's seat or at the upper center of the windshield, for example.

The communication unit 108 of the navigation apparatus 100 comprises a modem and a wireless communication device such as cellular phone and PHS for telephone call and data communication with the information center 150.

The communication unit 151 of the information center 150 comprises communication equipment such as a modem, a terminal adaptor and a router for communication with the navigation apparatus 100 through a communication link (telephone line, etc.).

The system control unit 152 comprises a computer system including a CPU, a ROM, a RAM and other devices. The CPU of the system control unit 152 controls the overall system in accordance with the programs stored in memory means including the ROM. The CPU also executes route searching for a recommended drive route in response to receipt of the current location and the destination from the navigation apparatus 100, on-route extracting of crossings on the recommended drive route, transmitting the crossing specifying data to the navigation apparatus 100, updating a database 153 (stored in a map information memory 1531) in response to collecting of new crossing/road data, and other operations to be made at the information center 150.

The ROM stores programs and data for use in execution of the operation by the CPU.

The RAM is used as a working memory area for writing and reading of data in execution of the operation by the CPU.

The database 153 includes a map information memory 1531, route data files 1532 and the external information files collected by the external information collection unit 154.

The external information which is collected by the external information collection unit 154 and stored in the external information files includes, for example, traffic jam information (location, distance and severeness of a traffic jam) and road construction information (section and period of road construction), traffic accident information (location and severity of a traffic accident, whether or not the road on which the accident has occurred is closed, expected time of reopening). This external information is used in route searching by the information center 150. The external information collection unit 154 also collects data regarding newly built roads and crossings, and data regarding changes in traffic restrictions (no entry, no right or left turn, etc.). These items of data are used to update the contents stored in the map information memory 1531.

The map information memory 1531 may be a CD-ROM, DVD-ROM, hard disc or other storage means of a large storage capacity. The map database stored in the map information memory 1531 includes crossing data files storing crossing data, road data files storing road data and node data files storing node data The road network data comprises the crossing data, the road data and the node data.

The crossing data files, the road data files and the node data files stored in the map information memory 1531 are substantially the same as those in the map information memory 1031 of the navigation apparatus 100, with the exception of the following.

First, the respective files in the map information memory 1531 are updated to reflect the latest data and, therefore, may have different contents than those of the files in the map information memory 1031 of the navigation apparatus 100.

In the map information memory 1031 of the navigation apparatus 100, as described before in connection with the data table of FIG. 3, there are a plurality of the crossing data files, each storing the crossing data contained in a specific rectangular block, for facilitating the matching operation. Such a matching operation is not required at the information center 150. Accordingly, the map information memory 1531 of the information center 150 may have a single crossing data file. In a modified embodiment, the map information memory 1531 stores a plurality of the crossing data files in the same manner as in the map information memory 1031 of the navigation apparatus 100. In this modified embodiment, the information center 150 transmits an identification code or number of a block containing the on-route crossings to the navigation apparatus 100, together with the crossing specifying data.

The node data files in the map information memory 1531 may be the same as shown by example as the data table of FIG. 5. In a modified embodiment, the map information memory 1531 would not have the node data files, because it is not always necessary that the searched drive route be displayed at the information center 150.

The route data files 1532 may be stored in a RAM or any other suitable storage medium. An example of the route data file 1532, which is prepared as a result of route search operation, is shown in FIG. 6. This route data file stores the crossing sequence data (FIG. 6(a)) and the node sequence data (FIG. 6(b)). The crossing sequence data comprises the name, identification number, angle and distance for each crossing. The node sequence data comprises the coordinates (longitude and latitude), the crossing number, attribute, angle and distance for each node. The on-route crossings extracted from the crossing sequence data of FIG. 6(a) are transmitted, via the communication unit 151, to the navigation apparatus 100.

In an embodiment wherein the navigation apparatus 100 also operates to search a drive route without data transmission from the information center 150, the route data files comprising the crossing sequence data (FIG. 6(a)) and the node sequence data (FIG. 6(b)) should also be stored in the RAM of the navigation apparatus 100.

In this embodiment, the navigation apparatus 100 sequentially reads out the road link numbers of the road links constituting the route from the crossing sequence data to specify the road link along which the vehicle should run. The node sequence data stored in the RAM of the navigation apparatus 100 may include only those crossings at which guidance for the driver is needed. Accordingly, the navigation apparatus 100 sequentially reads out the road link number every time the vehicle reaches a predetermined location.

The navigation apparatus 100 and the information center 150 operate as follows.

FIG. 7 is a flowchart of the operation to be executed by the navigation apparatus 100.

First, the arithmetic processing unit 101 acquires the destination inputted by the user and the current vehicle location (starting location) detected by the current location sensor 104, and transmits these items of data to the information center 150, via the communication unit 108 (at S1).

Communication between the communication units 108 and 151 is preferably made by using a packet switching technique. Alternatively, this communication may be by using a circuit switching technique.

The arithmetic processing unit 101 then acquires, via the communication unit 108, the crossing specifying data (a sequence of the coordinates of the on-route crossings) from the information center 150 (at S2). The crossing specifying data is stored in a predetermined area of the RAM.

The arithmetic processing unit 101 then carries out the matching operation (at S3). More particularly, each of the on-route crossings included in the crossing specifying data is compared with the crossing data in the crossing data file in the map information memory 1031 to specify a corresponding crossing.

Then, at S4, the arithmetic processing unit 101 specifies each road link between the two adjacent crossings specified at S3, and executes route guidance for guiding the user of the navigation apparatus along the specified road links (at S5).

The information center 150 operates as follows: FIG. 8 is a flowchart of the route search and transmission operation to be executed by the information center 150.

The system control unit 152 of the information center 150 acquires the destination and the starting point from the navigation apparatus 100, via the communication unit 151 (at S6).

The system control unit 152 then searches for a recommended drive route from the starting point to the destination, with reference to the crossing data, the node data and the road data in the map information memory 1531 (at S7). The route search operation may be made in a known manner, an example of which is described in Japanese patent laid-open publications No. 1-173297 and No. 1-173298, which are incorporated herein for reference.

The basic condition in searching a drive route is a distance between the crossings. In this embodiment, a route of the shortest distance from the starting point to the destination is determined as a drive route. The traffic jam and other traffic information acquired by the external information collection unit 154 should be taken into consideration in the route search operation. The searched drive route is stored in the route data file (FIG. 6) in the RAM.

The system control unit 152 then extracts the respective crossings on the drive route as on-route crossings from the crossing sequence data (FIG. 6(a)) in the route data file (at S8). A sequence of the coordinates of the extracted crossings (the on-route crossings) is transmitted via the communication unit 151 to the navigation apparatus 100 (at S9).

The operation of the navigation apparatus 100 and the information center 150 will now be described in more detail by way of example.

The operation of the information center 150 is diagrammatically shown in FIG. 9 and FIG. 10. In response to receipt of the starting location S and the destination M from the navigation apparatus 100, the information center 150 searches to determine a drive route, shown by solid lines, with reference to the crossing data in the map information memory 1531 and the road data shown by dotted lines.

Then, as shown in FIG. 10, crossings e1–e5 on the drive route are extracted so that a sequence of their coordinates is transmitted to the navigation apparatus 100 as the crossing specifying data.

The operation of the navigation apparatus 100 is diagrammatically shown in FIG. 11, FIG. 12 and FIG. 13. The map information memory of the navigation apparatus 100 stores the crossing data E1, E3–E5 and the road data shown as dotted lines in FIG. 12. In this example, as noted from comparison between FIG. 10 and FIG. 12, the on-route crossing e2 and the road links b2, b3 and b4 are included in the map information memory 1531 of the information center 150 but are not included in the map information memory 1031 of the navigation apparatus 100. Further, in the map information memory 1031 of the navigation apparatus 100, the road link bi is stored as a single road link connected between the crossings E1 and E3, whereas it comprises a first road link between the crossings e1 and e2 and a second road link between the crossings e2 and e3 in the map information memory 1531 of the information center 150. In addition, the road data between the on-route crossings e4 and e5 is contained in the map information memory 1531, but no corresponding road data is stored in the map information memory 1031.

In response to receipt of the crossing specifying data (a sequence of the coordinates of the on-route crossings e1–e5) from the information center 150, the navigation apparatus 100 stores this data into the RAM, together with the starting point S and the destination M which has been transmitted to the information center 150. FIG. 11 shows a map on which the starting point S, the destination M and the received on-route crossings e1–e5 are located.

Then, as shown in FIG. 12, the navigation apparatus 100 sequentially reads out the coordinates of the on-route crossings, which are matched with the crossing data in its own map information memory 1031. In this crossing matching operation, the crossings E1 and E3–E5 are extracted as corresponding to the on-route crossings e1 and e3–e5, but no crossing corresponding to the on-route crossing e2 is found in map information memory 1031. Accordingly, the navigation apparatus 100 judges that the on-route crossing e2 is a newly established crossing and locates the on-route crossing e2 at the coordinates in the crossing specifying data received from the information center 150.

Simultaneously with the crossing matching operation, the navigation apparatus 100 specifies each road link between two adjacent on-route crossings. As a result of the road link specifying operation, the road links from the starting location S to the destination M shown by solid lines in FIG. 13 are specified.

The navigation apparatus 150 judges that a road link is newly constructed between the crossings E4 and E5, because there is no corresponding road data in its own map information memory 1031. Accordingly, it adds a road link between the crossings E4 and E5, as shown in FIG. 13.

As described before, there is no crossing data in the map information memory 1031 corresponding to the on-route crossing e2. In this example, the crossing e2 is located on the road link between the crossings E1 and E3. Accordingly, the navigation apparatus 150 judges that there are two road links, one being connected between the crossings E1 and e2 and the other between the crossings e2 and E3. In this example, the existing road link between the crossings E1 and E3 is divided into two road links at the junction of the crossing e2.

If the crossing e2 which can not be found in the map information memory 1031 is not located on the road link between the crossings E1 and E3, the navigation apparatus 150 judges that there are two newly-constructed road links, apart from the existing road link between the crossings E1 and E3, one starting at the crossing E1 but separating therefrom to the crossing e2 and the other starting at the crossing e2 and terminating at the crossing E3.

In the manner described above, the drive route comprising the crossings E1, e2,–E3, E4 and E5 and the road links therebetween is specified as shown by solid lines in FIG. 13. This data are stored in the drive route memory area 1032. The drive route prepared by the navigation apparatus 100 will be the same as the drive route from the starting point S to the destination M in FIG. 9 which is prepared by the information center 150.

As described above, the navigation apparatus 100 carries out the matching operation to specify the crossings and the road links contained in the drive route to the destination, in accordance with the on-route crossings in the crossing specifying data from the information center 150. This matching operation will be described in more detail with reference to the flowchart of FIG. 14.

FIG. 14 shows a main routine for specifying the crossings and the road links which comprise the drive route, in accordance with the sequence of the coordinates of the on-route crossings (the crossing specifying data) received from the information center 150. After receipt, the sequence of the coordinates of the on-route crossings is stored in the RAM of the navigation apparatus 100.

First, the Arithmetic processing unit 101 of the navigation apparatus 100 acquires the coordinates of the i'th on-route crossing from the sequence of the coordinates of the on-route crossing in the RAM (at S10). It then sets a minimal distance minL of a predetermined sufficiently long distance, for example, 10,000 m (at S12).

The arithmetic processing unit 101 searches the nearest crossing to the i'th on-route crossing. More particularly, it reads out the crossing data of one crossing (hereinbelow referred to as a crossing E) in a block containing the on-route crossing (at S14). It then calculates a distance L from the i'th on-route crossing to the crossing E, that is a distance between the coordinates of these crossings (at S16).

The arithmetic processing unit 101 then compares the values of minL and L (at S18). When L is smaller than minL ("Yes" at S18), it is supposed that the crossing E is the nearest crossing to the i'th crossing so that the value of minL is replaced by the value of L and sets the identification code or number of the crossing E as min1D (at S20). When, on the other hand, L is equal to or greater than L ("No" at S18), meaning that the crossing E is not the nearest crossing to the i'th crossing, the step of S20 is skipped and the routine proceeds to directly advance to the, next step S22.

The arithmetic processing unit 101 judges if all of the crossings in the block have been subjected to the steps S14–S20. When there is any untreated crossing ("No" at S22), it is subjected to the steps S14–S20 in the above described manner.

When all of the crossings in the block have been treated through S14–S20 ("Yes" at S22), it is judged if minL is smaller than a first threshold H1 (at S24). More specifically, it is judged at S24 if the nearest crossing to the i'th crossing in the block is located within a predetermined distance (H1) from the i'th crossing.

When minL is smaller than the first threshold H1 ("Yes" at S24), the nearest crossing E is supposed to be located within a margin of matching error from the i'th crossing and, therefore, crossing E is judged to be the i'th crossing on the route. In this case, the arithmetic processing unit 101 stores the crossing ID (that is min1D) of the crossing. E as the on-route crossing in the drive route memory area 1032 (at S26), followed by execution of the subroutine of FIG. 15 for the road link setting operation (at S28).

When minL is equal to or greater than the first threshold H1 ("No" at S24), the arithmetic processing unit 101 determines the i'th on-route crossing as a new crossing. Accordingly, its coordinates are stored in the drive route memory area 1032 (at S30), and the sub-routine of FIG. 16 and FIG. 17 for new crossing/road link registration is executed (at S32).

After executing the operation at S28 or S32, the arithmetic processing unit 101 judges if all of the on-route crossings have been subjected to the matching operation (at S34). When the matching operation starts at the starting point 5, the destination M should also be subjected to the matching operation. When it starts at the destination M, it should also apply to the starting point If there is any on-route crossing which has not been subjected to the matching operation ("No" at S34), the arithmetic processing unit 101 increments the value of "i" by one (at S36) so that the next on-route crossing will be subjected to the matching operation.

The flowchart of sub-routine for the road link specifying operation at S28 is shown in FIG. 15. The road link setting is executed after the matching operation for the i'th crossing is completed, so as to specify a road link between the two adjacent crossings which have been matched with the i–1'th and the i'th on-route crossings. This operation is simply based on the assumption that there is only one road link between the two adjacent on-route crossings.

The arithmetic processing unit 101 judges if the i–1'th on-route crossing has been successfully matched with some crossing in the map information memory 1031 (at S40). When the matching operation has been completed for the i–1'th on-route crossing ("Yes" at S40), it then retrieves the road information of one the road links (refer to road link A hereafter ) which terminate at the i'th on-route crossing, from the road data files of FIG. 4 (at S42). It then judges if the retrieved road link A begins at the i–1'th on-route crossing (at S44).

If the retrieved road link A begins at the i–1'th on-route crossing ("Yes" at S44), the arithmetic processing unit 101 specifies the retrieved road link A as the drive route between the crossings. The number or code identifying the road link A is stored in the drive route memory area 1032 (at S46), and the procedure is returned to the main routine.

If the retrieved road link A does not begin at the i–1'th on-route crossing ("No" at S44), the arithmetic processing unit 101 then judges at S48 if all road links terminating at the i'th crossing have been checked at S44. When there remains any un-checked road link ("No" at S48), it is checked in the same manner.

When no road data corresponding a road link between the i–1'th and i'th crossings is found in the road information memory 1032, the judgment at S44 produces a "No" result for all of the road links terminating at the i'th crossing. In this case ("Yes" at S48), the new road link registration operation is executed at S50 in accordance with the flowchart of FIG. 18. In summary, the new road link registration operation at S50 is executed when the road information memory 1032 has the crossing data corresponding to the i–1'th and i'th crossings but does not have the road data corresponding to the road link connected therebetween. Then, the procedure is returned to the main routine.

When the matching operation has not been successfully made with respect to the i–1'th crossing ("No" at S40), the subroutine for the new crossing/road link registration operation shown in FIG. 16 and FIG. 17 is executed (at S52), and the procedure is returned to the main routine.

In summary, the new crossing/road link registration operation shown by the flowchart of FIG. 16 and FIG. 17 is executed when one or both of the i–1'th and i'th crossings has no corresponding crossing data in the road information memory 1032, whereby said one or both of the crossing not existing in the road information memory 1032 should be newly registered in said memory. In this case, the road link between the i–1'th and i'th crossings, at least one of which is not stored in the road information memory 1032, is absent in the memory, so that the road should also be newly registered in the memory.

Referring specifically to the flowchart of FIG. 16 and FIG. 17, the arithmetic processing unit 101 judges at S60 if neither of the i–1'th and i'th crossings have been matched by execution of the routine of FIG. 15. If only one crossing has failed to be matched ("No" at S60), said one crossing is identified as a crossing J (at S62). This is applicable to a case wherein the matching operation has succeeded with respect to the i–1'th crossing but not with respect to the i'th crossing (which occurs at S32) and also the case wherein the matching operation has succeeded with respect to the i'th crossing but not with respect to the i–1'th crossing (which occurs at S52). In the former case, the i'th crossing is identified as the crossing J at S62. In the latter case, the i–1'th crossing is identified as the crossing J at S62.

The arithmetic processing unit 101 determines minL having a sufficiently large value of 10,000 m, for example (at S64).

The arithmetic processing unit 101 then judges whether or not the unmatched crossing J is located on the road link stored in the map information memory 1031 of the navigation apparatus 100. For this judgment, at first, it retrieves one road link R of the road information within the block stored in the road data file (FIG. 4) at S66.

It then retrieves the node data (FIG. 5) of the retrieved road link R to determine the node Ni nearest to the crossing J and the node N2 nearest but one to the crossing J (at S68), and calculates the shortest distance between the crossing J and the N1–N2 segment (a length of a perpendicular line drawn from the crossing J toward the N1–N2 segment) to be L (at S70).

The arithmetic processing unit 101 compares the values of minL and L (at S72). When L is smaller than minL ("Yes" at S 72), it may be provisionally supposed that the point of intersection between the perpendicular line and the N1–N2 segment is nearest to the crossing J, so that it replaces the value of minL with the value of L Then the road R is determined as a provisional specific road and the coordinates of the point of intersection between the perpendicular line and the N1–N2 segment are determined as provisional crossing coordinates (at S74). When, on the other hand, L is equal to or larger than minL ("No" at S72), S74 is skipped because that point of intersection is not the nearest point to the crossing J.

At S76, the arithmetic processing unit 101 judges if all of the roads in the S block have been checked If there is any unchecked road in the block ("No" at S76), it is subjected to steps S66–S76 in the same manner as described above. If all of the roads have been checked ("Yes" at S76), it judges if minL is smaller than a second threshold H2 (at S80). In other words, it is judged at S80 if the crossing J is located on the provisional specific road R. When the crossing J is located within a predetermined distance of error (H2) from the provisional specific road R, it is treated as located on the road R.

If minL is smaller than the second threshold H2 ("Yes" at S80), the arithmetic processing unit 101 judges if the provisional specific road R is connected to one of the on-route crossings which has been successfully matched (at S82). More particularly, the i'th crossing is the unmatched crossing in the first case (at S32 of the flowchart of FIG. 14) so that the arithmetic processing unit 101 judges if the starting point of the provisional specific road R corresponds with the i–1'th crossing, at S82. In the second case wherein the i–1'th crossing is the unmatched crossing (at S52 of the flowchart of FIG. 15), the arithmetic processing unit 101 judges if the terminating point of the provisional specific road R agrees with the i'th crossing, at S82.

When the provisional specific road R is connected to the matched crossing ("Yes" at S82), the arithmetic processing unit 101 judges if the unmatched crossing is the i'th crossing (at S84). When the unmatched crossing is the i'th crossing ("Yes" at S84) which is applicable to the first case, the coordinates of the i'th crossing which have been stored in the drive route memory area 1032 at S30 in FIG. 14 are replaced by the provisional crossing coordinates determined at S74 (at S86).

When the unmatched crossing is the i–1'th crossing ("No" at S84), i.e., the second case, S86 is skipped because the necessary procedure has already been completed through the preceding new crossing/road link registration operation.

In this case, the unmatched crossing J is located on the provisional specific road R. Accordingly, the arithmetic processing unit 101 stores the provisional specific road R between the i'th crossing and the P1'th crossing as a road link therebetween in the drive route memory area 1032 (at S88), and the procedure is returned to the main routine.

When both crossings have failed to be matched ("Yes" at S60), when minL is equal to or larger than the second threshold H2 meaning that the crossing J is not located on or around the provisional specific road R ("No" at S80) or when the crossing J is located on or around the provisional specific road R but the starting or terminating point of the provisional specific road R does not correspond to the matched crossing ("No" at S82), the new road link registration operation is executed at S89 and the procedure is returned to the main routine.

FIG. 18 is a flowchart of the new road link registration operation executed at S50 in FIG. 15 and at S89 in FIG. 17. This operation is executed when a road link between the crossings specified in the matching operation or a road link containing the crossing specified in the matching operation does not exist in the present road data in the map information memory 1031, so that the road link is registered in the map information memory 1031 as a new road date The arithmetic processing unit 101 connects the crossing corresponding to the i'th on-route crossing and the crossing corresponding to the i–1'th on-route crossing by a straight line (at S90). It the stores the straight line as a road link connected between those two crossings in the drive route memory area 1032 (at S92), and the procedure is returned to the main routine.

FIG. 19–FIG. 24 are explanatory views illustrating the manner of the operation shown by the flowcharts of FIG. 14–FIG. 18. In FIG. 19–FIG. 24, the crossings e1 and e2 are the on-route crossings stored in the crossing specifying data transmitted from the information center 150 are shown as "X". The crossing e1 is the i–1'th on-route crossing and the crossing e2 is the i'th on-route crossing. Shown by the mark "●" are the crossings E1 and E1 which are stored in the crossing data file (FIG. 3) in the map information memory 1031 of the navigation apparatus 100 corresponding to the on-route crossings e1 and e2, respectively. The road data file (FIG. 4) in the map information memory 1031 stores the road links Ri and R2 shown as solid lines.

A circle H1 has a center at each of crossings e1 and e2 with a radius of H1 which is the first threshold. When a crossing E1 or E2 is located within the circle H1, it is determined that the corresponding on-route crossing e1 or e2 is successfully matched with the crossing E1 or E2. Then the matched crossings E1 or E2 are specified as the on-route crossings corresponding to e1, e2 and stored in the drive route memory area 1032.

FIG. 19 shows an example where both of the on-route crossings e1, e2 25 received from the information center 150 can be matched with the crossings E1, E2 in the navigation apparatus 100 (at S24–S28). As shown, the crossings E1 and E2 are both located within the circles Hi. Therefore, the crossing identification codes or numbers (E1, E2) are stored in the drive route memory area 1032 as the on-route crossings at S26 and the road link Ri therebetween is stored as part of the drive route at S46.

In FIG. 20, the on-route crossing e1 received from the information center 150 can be matched with the crossing E1 in the navigation apparatus 100 but the other on-route crossing e2 can not be matched with the crossing E2 (at S32→S86→S88). This is an example of the above-described first case. As shown, the crossing E1 is located within the circle H1 centered on e1 but the crossing E2 is located outside of the circle H1 centered on e2. In this case, the on-route crossing e2 is regarded as a new crossing so that the coordinates thereof are stored in the navigation apparatus 100 at S30.

In the example shown in FIG. 20, a distance minL between the on-route crossing e2 and the provisional specific road Ri (shown by dotted line) is smaller than the second threshold H2 ("Yes" at S80), the provisional specific road Ri is connected to the crossing E1 corresponding to the matched on-route crossing e1("Yes" at S82), and the i'th on-route crossing e2 is the unmatched crossing J ("Yes" at S84). Accordingly, the coordinates of the on-route crossing e2 which have been stored as the new crossing at S30 are replaced with those of the intersection point between the perpendicular line and the provisional specific road Ri (at S86). Further, the road link between the matched crossing E1 and the intersection point is registered in the drive route memory area 1032 as new road link data.

In FIG. 21, the on-route crossing e1 received from the information center 150 can be matched with the crossing E1 in the navigation apparatus 100 but the other on-route crossing e2 can not be matched with the crossing E2, and a distance minL (shown as dotted lines) between the on-route crossing e2 and the provisional specific road Ri is equal to or larger than the second threshold H2 (at S32→S80:N→S89). In this case, the coordinates of the unmatched on-route crossing e2 are registered in the drive route memory area 1032 as new crossing data. Further, between the matched crossing E1 and the unmatched crossing e2 is drawn a straight line, which is registered in the drive route memory area 1032 as a new road link therebetween, by execution of the sub-routine of the new road link registration operation at S89.

In FIG. 22, the on-route crossing e1 received from the information center 150 can be matched with the crossing E1 in the navigation apparatus 100 but the other on-route crossing e2 can not be matched with the crossing E2, and the on-route crossing e2 is located on or around the provisional specific road R2 which is not connected to the crossing E1 corresponding to the i−1'th on-route crossing e1 (at S32→S82:N→S89). In this case, a straight line is drawn between the matched crossing E1 and the unmatched crossing e2 and is shown as a dashed line in FIG. 22. This straight line is registered in the drive route memory area 1032 as a new road link therebetween, by execution of the sub-routine of the new road link registration operation at S89.

In FIG. 23, both the on-route crossings e1, e2 received from the information center 150 can be matched with the crossings E1, E2 in the navigation apparatus 100, but none of the road links R2, R3 terminating at the crossing E2, corresponding to the i'th on-route crossing e2, has the other end (starting point) at the crossing 25 E1 corresponding to the i−1'th crossing e1 (at S28→S44:N→S48:N→S50). In this case, a straight line is drawn between the matched crossings E1 and E2, shown as a dashed line in FIG. 23, and the line is registered in the drive route memory area 1032 as a new road link therebetween, by execution of the sub-routine of the new road link registration operation at S50.

In FIG. 24, neither of the on-route crossings e1, e2 received from the information center 150 can be matched with the crossings E1, E2 in the navigation apparatus 100 (at S30→S32→S60:Y→S89). In this case, the unmatched crossings e1, e2 are regarded as new crossings, a straight line is drawn therebetween, shown as a dashed link in FIG. 24, and the line is registered in the drive route memory 10 area 1032 as a new road link, by execution of the sub-routine of the new road link registration operation at S89.

As is apparent from the foregoing description, the recommended drive route information that the navigation apparatus 100 receives from the information center 150 comprises only the coordinates of the on-route crossings. This reduces the data volume to be transmitted from the information center 150, which is particularly advantageous when data transmission is made using a packet switching technique. The reduced data volume in transmission results in a reduction in the transmission period, which is also advantageous when data transmission is made using a circuit switching technique.

Because the map information memory 1031 in the navigation apparatus 100 is not as frequently updated as the map information memory 1531 in the information center 150, it is possible that the received on-route crossing can not be matched with any of the crossings stored in the map information memory 1031. It is also possible that the navigation apparatus 100 can not identify any road link between the received on-route crossings. In the above-described embodiment, the navigation apparatus 100 may determine new crossings and/or road links based on the received crossing coordinates, which are additionally registered in its own memory. Accordingly, even when the map data stored in the map information memory 1031 of the navigation apparatus 100 has contents (crossing data files, road data files) different from those of the map data stored in the map information memory 1531 of the information center 150, the navigation apparatus 100 may reproduce the drive route to the destination, which has been determined by the information center 150, from the coordinates sequence of the on-route crossings received from the center device 150. Therefore, the user of the navigation apparatus is guided to the destination along the reproduced drive route.

The navigation apparatus 100 determines the drive route in accordance with the coordinates of the on-route crossings, and no further data is required in determination or reproduction of the drive route by the navigation apparatus 100. This means that the navigation apparatus 100 may execute the matching operation even if there is a difference or discrepancy between the format or version of the data in the navigation apparatus 100 and that in the information center 150.

The above described first embodiment may be subjected to various 20 modifications as far as they are within the scope of the invention defined by the appended claims.

For example, when no road link can be specified between the crossings, in the above-described first embodiment, the new road link is determined by connecting the on-route crossings by a straight line in the new road link registration operation shown in FIG. 18. However, in this case, the navigation apparatus 100 sends to the information center 150 a request to transmit the road information between the crossings. In response to the request, the information center 150 transmits the road information to the navigation apparatus 100, and the navigation apparatus stores the transmitted data in the drive route memory area 1032. The road information transmitted from the information center may comprise the node sequence of the road link.

Although the map information memory 1031 of the navigation apparatus 100 includes the crossing data file (FIG. 3) in the above described first embodiment, it is not always necessary. Even when the map information memory 1031 consists of the road data (and the node data) and includes no crossing data, the navigation apparatus 100 recognizes a point of intersection between two road links as a crossing. The coordinates of the intersection may be registered as the crossing data The crossing specifying data transmitted from the information center 150 to the navigation apparatus 100 comprises the sequence of the coordinates of the on-route crossings in the above-described first embodiment, but it may further include appendant information. The appendant information may be used by the navigation apparatus 100 to facilitate the route specifying operation (matching operation). The appendant information may also be used in the route guidance operation.

More particularly, the appendant information may comprise one or a combination of (a) the codes or numbers identifying the crossings and/or road links (b) the road coordinates (the coordinates of nodes on the road, for example) (c) the guidance information specifying the crossings at which route guidance is carried out and their attribute information; and (d) the detailed guidance information (such as landmark information).

Figure 25A:
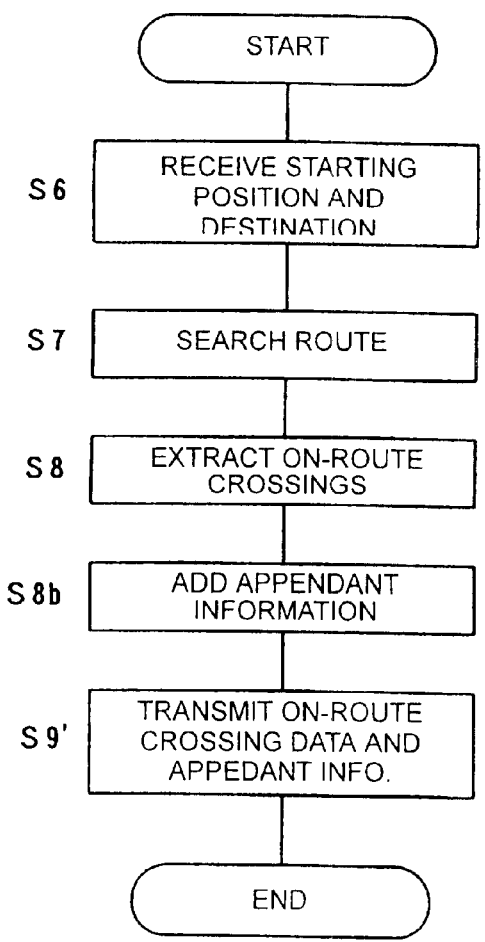
FIG. 25 is a flowchart for appending the additional information to the crossing specifying data in the route search and transmission operation by the center device.

FIG. 25(a) is a flowchart of the routine to be executed by the information center 150, when the crossing specifying data transmitted from the information center 150 to the navigation apparatus 100 includes the appendant information, which corresponds to the flowchart of FIG. 8 to be executed when the crossing specifying data does not include the appendant information.

As shown, after extracting the on-route crossings at S8, the system control unit 152 adds the appendant information (at 58b) and transmits the crossing specifying data comprising the sequence of the coordinates of the extracted crossings and the appendant information to the navigation apparatus 100 (at S9').

When the appendant information includes the crossing/ road link identifying information, the navigation apparatus 100 need not execute the operations of steps FIG. 14–FIG. 18. The navigation apparatus 100 may easily identify the crossings and the road links from their identification codes or numbers. However, when there is any difference or discrepancy between the format or version of the data in the navigation apparatus 100 and in the information center 150, the matching operation can not be made by using the crossing/road link identification codes or numbers. In such case, the navigation apparatus 100 is required to execute the operations shown in FIG. 14–FIG. 18.

Figure 25B:
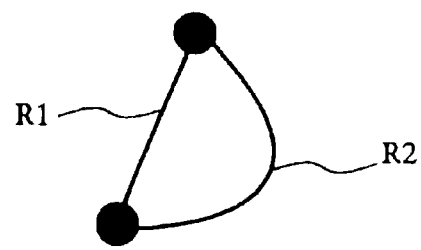

FIG. 25(b) shows an example wherein there are two road links between the same two crossings. When the navigation apparatus 100 receives only the coordinates of the two crossings, it is not possible to specify either one of the road links R1, R2. However, when the road coordinates are included as the appendant information, one of the road links R1, R2 is easily specified.

The road coordinates may also be used in the new road link registration operation. In the above-described first embodiment, when no data for a road between the two crossings is stored in the map information memory 1031, the navigation apparatus 100 determines a new road link by drawing a straight line between the two crossings. But the actual road corresponding to the determined road link may not be straight. When the navigation apparatus 100 receives the road coordinates, it will be possible to make a new road link substantially equivalent to the shape of the actual road by respectively connecting the crossings and the road coordinates.

The landmark information may not be stored in the navigation apparatus. In this case, nevertheless, the navigation apparatus executes the route guidance operation with the landmark information transmitted from the information center as the appendant information.

The crossing and/or road link identification codes or numbers may be regarded as a part of the crossing specifying data This modification also facilitates the matching operation by the navigation apparatus 100. Only when the matching operation can not be made due to a difference in format or version of the data between the navigation apparatus 100 and the information center 150, is the navigation apparatus 100 required to execute the operations shown in FIG. 14–FIG. 18.

In the above-described first embodiment, the navigation apparatus 100 alone can execute a search for a route to the destination. However, the navigation apparatus 100 need not have such a route searching capability, because it may reproduce the drive route which has been searched by the information center 150, by using the crossing specifying data transmitted therefrom.

In the above-identified first embodiment, the information center 150 operates, in response to receipt of the current position and the destination from the navigation apparatus 100, to search for a route to the destination and to prepare the crossing specifying data, which is sent back to the navigation apparatus 100. When the system is so designed that the information center 150 specifies location where a customer is waiting for a taxi or where a luggage is to be collected or delivered to a taxi driver or an express company, the navigation apparatus 100 need not transmit the current position and the destination to the information center 150.

(3) Summary of Second Embodiment

The second embodiment also relates to a communication navigation system wherein a navigation apparatus 100 mounted on a vehicle communicates with an information center 150 so that the navigation apparatus 100 executes route guidance operation with the help of information transmitted from the information center 150.

In accordance with the second embodiment, in a system wherein the information center 150 executes a route searching operation, the result of which is transmitted to the navigation apparatus 100 (i.e., a mobile data-processing unit mounted on the vehicle), it is possible to execute the route guidance operation even if there is a difference in versions between the road information stored in the navigation apparatus 100 and the road information stored in the information center 150. More particularly, the navigation apparatus 100 transmits version data of the road information stored in the navigation apparatus, and then the information center 150 compares a version of data for each of a road link (or a predetermined unit comprising a series of the road links) on the searched route to the destination with the transmitted version data. When data of the same version are stored both in the information center 150 and in the navigation apparatus 100, the information center 150 transmits simply the road identification number or code. In this case, the navigation apparatus 100 executes the route guidance operation by retrieving the road attribute information from its own memory by referring to the road identification number or code transmitted from the information center 150.

When the data version in the information center 150 is newer than the data 10 version in the navigation apparatus 100, the information center 150 transmits the road attribute information, as well as the road identification number or code, to the navigation apparatus 100. In this case, the navigation apparatus 100 executes the route guidance operation by using the mad attribute information transmitted from the information center 150.

Accordingly, the navigation apparatus 100 may execute the route guidance operation by using the latest road data stored in the information center 150, even when such latest road data has not yet been stored in the navigation apparatus 100. The data volume to be transmitted from the information center 150 to the navigation apparatus 100 is thereby minimized.

(4) Detailed Description of Second Embodiment

The information center 150 and the navigation apparatus 100 are substantially the same as in the first embodiment shown in FIG. 1, except that they have different programs and data contents. Such differences will be described below in detail.

In the second embodiment, the road network data for use in the route searching operation is stored in the map information memory 1531 of the database 153 in the information center 150. The road data comprises a plurality of the road network data.

The road network data comprises the road data files (FIG. 4) and the crossing data file (FIG. 3) of the first embodiment. However, in this embodiment, data for one road network includes only one crossing data file. Accordingly, the crossing data file in this embodiment has no block specifying data such as shown in the left-most column in FIG. 3. The information center 150 stores the road network data of different versions. The information center 150 makes use of the road network data of the latest version to search for a route to the destination. The information center 150 uses the road network data of an older version when it is necessary to confirm whether the latest road attribute information for the road links on the searched route is stored in the navigation apparatus 100.

The information center 150 stores the result of the route searching operation which comprises a sequence of the road identification numbers or codes, and the road attribute information as route data files 1532. FIG. 26 is an example of a data table showing the results of a route searching operation, and FIG. 27 is an example of a data table showing road attribute information.

FIG. 26 shows a sequence of the road identification numbers or codes of road links which constitute the route searched by the information center 150. Each road link has its version number shown in the right column in FIG. 26, which is shown merely for explanation and not actually stored in the route data file 1532.

As shown in FIG. 27, the road attribute information comprises the road identification number or code, the coordinate data for display and map matching, the number of lanes, the road link length, etc. for each road link which is not stored in the navigation apparatus 100. Data in the road attribute information is retrieved from the data file (FIG. 4).

In this embodiment, the result of the route searching operation comprising a sequence of the road identification numbers or codes, and the road attribute information, both temporarily stored in the route data files 1532, are transmitted to the navigation apparatus 100 for route guidance.

In the navigation apparatus of the second embodiment, as in the information center 150, the road network data for route searching operation is stored in the map information memory 1031 of the data memory 103. The version information (version identification number) of the road network data is also stored in the map information memory 1031.

The map information memory 1031 may comprise any suitable storage 15 means, and most preferably is a DVD-ROM. The version information of the road network data stored in the navigation apparatus 100 will be referred to as a DVD version in the following description.

The drive route memory area 1032 is located in a predetermined area on the RAM, as in the first embodiment, for storing the result of route searching (which may be referred to as a road ID sequence in the following description) and the road attribute information, both transmitted from the information center 150. The route guidance operation is carried out based on the road ID sequence and the road attribute information stored in the drive route memory area 1032 and the road network data stored in the map information memory 1031.

The information center 150 and the navigation apparatus 100 will operate as follows in the second embodiment.

In the following description, the oldest version of the road network data is referred to as "1.00" which is updated to "1.05", then to "1.10" and then to "1.11" which is the latest version at this time. The road network data of these different versions is all stored in the information center 150. The navigation apparatus 100 which requests the information center 150 to search a route has the road network data of the DVD version 1.05.

FIG. 28 diagrammatically shows an example of the road network data of the latest version 1.11 stored in the information center 150 for some area, whereas FIG. 29 diagrammatically shows an example of the older version 1.05 stored in the navigation apparatus 100 for the same area As shown by comparison between FIG. 28 and FIG. 29, the road network data of the latest version 1.11 shown in FIG. 28 has a new road link of ID No.7 which does not exist in the road network data of the older version 1.05 shown in FIG. 29. Since the new road link of ID No.7 is connected between an intermediate point on the existing road link of ID No.2 and another intermediate point on the existing road link of ID No.5 as shown in FIG. 29, it becomes necessary that the road link of ID No.2 in the old version 1.05 be divided into two links of ID No.10 and No.11 which appear in the latest version 1.11. Likewise, the road link of ID No.5 in the old version 1.05 is divided into two links of ID No.8 and No.9 as appearing in the latest version 1.11.

The information center 150 will operate as shown by the flowchart of FIG. 30. The system control unit 152 of the information center 150 awaits receipt of data transmission from the navigation apparatus 100 through a wireless instrument such as a cellular phone using a packet or circuit switching technique. Upon receipt of the staring point, the destination and the DVD version (version 1.05), the system control unit 152 stores these items of data in a predetermined area on the RAM (at S500).

The system control unit 152 starts searching for a recommended route from the starting point to the destination by using the road network data of the latest version (version 1.11) stored in the map information memory 1531 (at S502). In the route searching operation by the system control unit 152, the information regarding time and point of occurrence of a traffic jam, traffic accident, and road construction acquired by the external information collection unit 154 should also be considered so as to search a route which may detour such a troublesome point.

It is supposed that the route searched at S502 comprises the road links of ID No.1, 10, 7, 8 and 6 in the order as shown by hatched lines in FIG. 28. As a result of this route searching operation, the road ID sequence is stored as shown by the data table of FIG. 26. This route searching operation was carried out in accordance with the road network data of the latest version 1.11, so that the searched route may contain one or more road links which are not stored in the road network data of the older version 1.05 stored in the navigation apparatus 100. In this example, the road links of No.10, No.7 and No.8 are not contained in the navigation apparatus 100. The system control unit 152 judges whether or not each road ID number on the searched route is stored in the map information memory 1031 of the navigation apparatus 100 (at S504). When the searched route comprises the road links of ID No.1, 10, 7, 8 and 6 in the order as shown in FIG. 28, it is first judged whether or not the road link of ID No. 1 is stored in the memory 1031. This judgment may be made by referring to the road network data stored in the memory 1531 of the version identical to the DVD version (1.05) received from the navigation apparatus 100 at S500, to confirm whether or not the road link of ID No. 1 is contained therein. In this example, the road link of ID No. 1 is already contained in the road network data of version 1.00 (see FIG. 26) which is of course contained in the road network data of the DVD version 1.05 in the memory 1031 of the navigation apparatus 100 ("No" at S504). Accordingly, the road ID No.1 is stored in a transmission buffer. The road attribute information is not prepared in this case, so that S506 is skipped.

Next, at S508, it is judged whether or not all of the road links on the searched route have been checked Since only the road ID No.1 has been checked ("No" at S508), the next road ID No.10 is retrieved (at S510) and subjected to the version check at S504. As shown in FIG. 26, the road ID No.10 is added at the time of up-version from 1.05 to 1.10 and, therefore, not contained in the road network data of the DVD version 1.05 in the navigation apparatus 100. Accordingly, it is judged that there is no road ID in the memory 1031 corresponding to the mad ID No. 10 ("Yes" at S504) and the road attribute information is prepared (at S506).

At S506, in order that the navigation apparatus 100 executes a route guidance operation wherein the road ID No.10, not existing in the memory 1031, is represented in the display 106, which guides the user of the navigation apparatus to the destination, the system control unit 152 prepares the attribute information of the road ID No.10 by reference to the road data file (FIG. 4)and stores the same in the route data file 1532 as shown by example in FIG. 27. The road attribute information prepared at S506 is stored in the transmission buffer.

In this example, the roads ID No.7 and No.8 are not stored in the road network data of the DVD version 1.05 in the memory 1031. Accordingly, through S504-S510, the attribute information regarding these road links is prepared and stored in the route data file 1532 and in the transmission buffer, in the same manner as described above in connection with the road ID No.10.

Regarding the road ID No.6 which is contained also in the road network data of the DVD version 1.05 in the memory 1031 ("No" at S 504), this road ID No.6 is stored in the transmission buffer, without necessity of preparing the road attribute information.

After all of the road links on the route have been checked ("Yes" at S508), the road ID sequence (the road specifying data) and the road attribute information stored in the transmission buffer are transmitted to the navigation apparatus 100 (at S512). In this example, the road ID numbers for all of the road links (the road ID sequence) and the road attribute information regarding the road ID No.10, No.7 and No.8 are transmitted to the navigation apparatus.

The navigation apparatus 100 will operate as shown by the flowchart of FIG. 31. The arithmetic processing unit 101 of the navigation apparatus 100 transmits the starting point, the destination and the DVD version to the information center 150 to request a route searching operation (at S600). As described above, in response to this request, the information center 150 prepares the searched route and the road attribute information, which are transmitted to the navigation apparatus (at S512 of the flowchart of FIG. 30). The navigation apparatus 100 stores the received data in the drive route memory area 1032 (at S602).

The arithmetic processing unit 101 judges whether or not the received route information (the road ID sequence) is accompanied by the attribute information (at S604). When there is no attribute information ("No" at S604), which means that all of the road data corresponding to the received road ID are stored in the map information memory 1031, the arithmetic processing unit 101 executes the route guidance operation by using said road data (FIG. 4).

When there is some attribute information ("Yes" at S604), which means that some of the received road ID is not contained in the map information memory 1031, the arithmetic processing unit 101 executes the route guidance operation by using the received road attribute information in combination with the road data in the map information memory 1031. More particularly, with respect to the road link which can be found by its ID number (the road ID No. 1 and No.6 in this example), the arithmetic processing unit 101 retrieves its road attribute information from the road data file in the map information memory 1031 to prepare a route segment ("No" at S604 S606 ). With respect to other road links (the road ID No.10, No.7 and No.8), the arithmetic processing unit 101 prepares a route segment based on its road attribute information received from the information center 150 (S608). These route segments are connected with each other to prepare a complete route to the destination.

In accordance with the above-described second embodiment, the navigation apparatus 100 transmits the version of the road network data stored therein, as well as the starting point and the destination, when requesting the route searching by the information center 150. The information center 150 searches for a route by using the road network data of the latest version stored therein to prepare the road ID sequence. Also, the information center 150 judges whether or not each road ID is contained in the memory 1032 of the navigation apparatus 100 by reference to the version information received from the navigation apparatus 100. The road attribute information regarding the road ID not contained in the navigation apparatus 100 is prepared, and then transmitted to the navigation apparatus 100 together with the road ID sequence.

Accordingly, even if the road network data held in the navigation apparatus 100 and the road network data used in the route searching operation at the information center 150 are different versions and have different contents, it is possible for the navigation apparatus 100 to execute the route guidance operation in accordance with the road network data of the latest version.

The above-described second embodiment may be subjected to various modifications as far as they are within the scope of the invention defined by the appended claims.

The information center 150 may store only the road network data of the latest version, instead of storing a plurality different versions of road network data. In this modification, the information center 150 stores the road ID version data which is updated each version updating and specifies the version number and the road ID to be added and/or deleted in this version. When, for example, the road network of FIG. 29 is updated to that of FIG. 28, the road ID version data is updated such that the road ID No.10, No.7 and No.8 are added as version 1.10 and the road ID No.2 and No.5 of version 1.05 are deleted.

In this modification wherein the information center 150 stores the road ID 25 version data, it becomes unnecessary to store the road network data of older versions. Further, the version check at S504 may be processed speedily, because the system control unit 152 of the information center 150 simply retrieves the version number for each road link of the road ID sequence from the road ID version data and compares said version number with the received DVD version.

In the above-described second embodiment, the information center has the map data of a later version than that stored in the navigation apparatus. In a modified embodiment, the navigation apparatus was an image display (such as icons indicative of remarkable facilities) of a specific version whereas the information center has the image display data of the latest version which contains, for example, icons indicative of newly-developed golf courses which are not contained in the image display of the navigation apparatus.

For example, if a newly-developed golf course is added as destination data in the information center and the image display data of the older version in the navigation apparatus has no data for displaying this golf course, when the navigation apparatus mounted on the vehicle solely uses its own image display data, a map of an area which should include this golf course is represented on the display 106 but the golf course itself can not be displayed, which makes it impossible for the user to confirm that the golf course (the destination) really exists within the displayed area To cope with this problem, in this modified embodiment, in response to receipt of the version number of the image display data in the navigation apparatus, together with a request for transmission of a selection menu for destination, the information center judges, based on its own image display data of the latest version, whether or not the image display data of an icon indicative of a newly-developed golf course is to be transmitted. When the version of the image display data in the navigation apparatus is older than that in the information center, it is judged that the image display data of the golf course indicating icon should be transmitted, so that said image display data is transmitted to the navigation apparatus together with the destination selection menu.

When the user selects the newly-developed golf course as the destination, the navigation apparatus operates to display a map of an area including this golf course based on its own image display data. At the same time, the golf course icon is shown on the displayed map in accordance with the image display data received from the information center. Accordingly, the user can confirm that the golf course where he wishes to go is on the displayed map, even though this golf course data is not included in the image display data of the navigation apparatus.

Although the present invention has been described in conjunction with specific embodiments thereof, it is to be understood that it is capable of considerable variation and modification without departure from the scope of the appended claims.

The teachings of Japanese Application 11-328,881, filed Nov. 18, 1999, are incorporated herein in their entirety, inclusive of the specification, claims and drawings.

What is claimed is:

1. A communication navigation system which includes an information center and a vehicle mounted navigation apparatus, in which data concerning a recommended route from a current location of the navigation apparatus to a destination is transmitted from the information center to the navigation apparatus, and then route guidance is carried out by the navigation apparatus using the data transmitted from the information center, wherein the navigation apparatus comprises:

road information storage means containing stored first road information including first road network data including a plurality of road links and first identification data of the first road information;

data transmitting means for transmitting data of a current location and a destination of the navigation apparatus and the first identification data to the information center;

data receiving means for receiving data of recommended route guidance information from the information center;

route guidance data generating means for generating route guidance data based on the first road information stored in the road information storage means and based on the recommended route guidance information transmitted from the information center and route guiding means for guiding a user of the navigation apparatus from the current location to the destination of the navigation apparatus using the route guidance data; and wherein the information center comprises:

a database containing stored second road information including second road network data including a plurality of road links and second identification data of said second road information;

data receiving means for the transmitted data of the current location and the destination of the navigation apparatus and the transmitted first identification data;

recommended route determining means for determining a recommended route, by extracting recommended road links from the second road network data stored in the database, from the current location to the destination received from the navigation apparatus, based on the second road information stored in the database;

judging means for judging respectively whether or not each recommended road link along the recommended route is contained in the first road information, by comparing the first identification data transmitted from the navigation apparatus with the second identification data of the road information stored in the database;

recommended route guidance information generating means for generating recommended route guidance information, based on the database, containing first enabling data enabling retrieval of first recommended road link from the road information storage means, the first recommended road links being those recommended road links judged to be contained in the first road information, and second enabling data enabling reconstruction of second recommended road links, the second recommended road links being those recommended road links judged not to be contained in the first road information; and data transmitting means for transmitting said recommended route guidance information to the navigation apparatus.

2. The communication navigation system as claimed in claim 1, wherein the route guidance data generating means comprises:

(a) means for extracting recommended road links, specified by the transmitted first enabling data, from the first road information stored in the road information storage means in the navigation apparatus, and (b) means for reconstructing recommended road links by using the transmitted second enabling data enabling reconstruction of each recommended road link along the recommended route; and wherein said route guidance data generating means uses the means of (a) and/or (b) for generating the route guidance data.

3. The communication navigation system as claimed in claim 2, wherein the first road information stored in the road information storage means further includes first guidance data corresponding to the plurality of the road links, and the second road information stored in the database further includes second guidance data corresponding to the plurality of the road links, and the recommended route guidance information generating means generates the recommended route guidance information further containing the second guidance data corresponding to each recommended road link which is judged not to be contained in the first road information, and the route guidance data generating means generates the route guidance data as a combination of the second guidance data contained in the transmitted recommended route guidance information and the first guidance data extracted from the road information storage means.

4. The communication navigation system as claimed in claim 3, wherein both of the first guidance data stored in the road information storage means and the second guidance data stored in the database contain, for each road link, at least one of:

data of a road length;

data of coordinates for drawing;

data of coordinates for matching a location of the navigation apparatus; and data of number of lanes.

5. The communication navigation system as claimed in claim 1, wherein both of the first identification data stored in the road information storage means and the second identification data stored in the database are version numbers of the corresponding first and second road information, the database has road information of all versions, the recommended route determining means determines the recommended route using road information of a latest version stored in the database, and the judging means judges whether or not each recommended road link along the recommended route is contained in the first road information, by comparing the latest version number with the version number transmitted from the navigation apparatus.

6. The communication navigation system as claimed in claim 1, wherein the first identification data stored in the road information storage means is a version number of the first road information, and each road link in the database contains a version number expressing a road information version, and the judging means judges whether or not each recommended road link along the recommended route is contained in the first road information, by respectively comparing the version number of each recommended road link with the version number transmitted from the navigation apparatus.

7. The communication navigation system as claimed in claim 1, wherein the information center further comprises external information acquisition means for acquiring latest traffic conditions and/or latest road conditions, and the recommended route determining means determines the recommended route from the current location to the destination of the navigation apparatus in consideration of the latest traffic conditions and/or the latest road conditions.

8. The communication navigation system as claimed in claim 1, wherein both of the data transmitting means and the data receiving means of the information center, and both of the data transmitting means and the data receiving means of the navigation apparatus are designed so as to communicate using a packet switching technique and/or a circuit switching technique.

9. A navigation apparatus which guides a user from a current location to a destination comprising:

road information storage means for storing first road information which includes a plurality of road links and first identification data identifying the first road information;

data transmitting means for transmitting data concerning the current location and the destination of the navigation apparatus and the first identification data to an information center;

data receiving means for receiving data concerning recommended route guidance information from the information center;

route guidance data generating means for generating route guidance data based on the first road information and the recommended route guidance information; and route guiding means for guiding the user from the current location to the destination using the generated route guidance data;

wherein the first road information contains, for each road link, at least one of:

data of road length;

data of coordinates for drawing;

data of coordinates for matching a location of the navigation apparatus; and data of number of lanes.

10. An information center, which receives/transmits data from/to a navigation apparatus having road information storage means containing stored first road information including a plurality of road links and first identification data identifying the first road information, said information center comprising:

a database storing second road information including a plurality of road links and second identification data identifying the second road information;

data receiving means for receiving data concerning a current location and a destination of the navigation apparatus and the first identification data transmitted from the navigation apparatus;

recommended route determining means for determining a recommended route from the current location to the destination, and for identifying road links along the determined recommended route utilizing the second road information;

judging means for judging respectively whether or not each identified road link is contained in the first road information, by comparing the first identification data with the second identification data;

recommended route guidance information generating means for generating recommended route guidance information, based on the database, containing first enabling data enabling retrieval from the first road information of those identified road links judged to be contained in the first road information and second enabling data enabling reconstruction of those identified road links judged not to be contained in the first road information; and data transmitting means for transmitting the generated recommended route guidance information to the navigation apparatus.

11. The information center as claimed in claim 10, wherein the second road information contains, for each road link, at least one of:

data of a road length;

data of coordinates for drawing;

data of coordinates for matching a location of the navigation apparatus; and data of number of lanes.

* * * * *

UNITED STATES PATENT AND TRADEMARK OFFICE
CERTIFICATE OF CORRECTION

PATENT NO.    : 6,542,816 B1
DATED         : April 1, 2003
INVENTOR(S)   : Ito et al.

It is certified that error appears in the above-identified patent and that said Letters Patent is hereby corrected as shown below:

Column 3,
Line 1, "and the each" should read -- and each --.

Column 4,
Line 8, "specify the each data of the" should read -- specify the data for each of the --.

Column 6,
Line 23, "data" should read -- data. --.
Lines 25-26, delete "its own road data".

Column 7,
Line 45, delete "are stored".
Line 65, "stores" should read -- store --.

Column 8,
Line 34, "command" should read -- command. --.
Line 50, delete "an".

Column 9,
Line 39, "files storing node date The" should read -- files storing node data. The --.

Column 12,
Line 29, "mad" should read -- road --.

Column 13,
Line 51, "starting point" should read -- starting point S. --.

Column 14,
Lines 42, "bot h of the crossing" should read -- both of the crossings --.

Column 16,
Line 18, "date" should read -- data. --.

Column 20,
Line 1, "data" should read -- data. --.
Line 63, "mad" should read -- road --.

UNITED STATES PATENT AND TRADEMARK OFFICE
CERTIFICATE OF CORRECTION

PATENT NO. : 6,542,816 B1
DATED : April 1, 2003
INVENTOR(S) : Ito et al.

It is certified that error appears in the above-identified patent and that said Letters Patent is hereby corrected as shown below:

Column 22,
Line 25, "area" should read -- area. --.

Column 23,
Line 23, "checked" should read -- checked. --.

Column 25,
Line 24, "area" should read -- area. --.

Signed and Sealed this

Thirty-first Day of August, 2004

JON W. DUDAS
*Acting Director of the United States Patent and Trademark Office*